US010511591B2

United States Patent
Campagna et al.

(10) Patent No.: US 10,511,591 B2
(45) Date of Patent: Dec. 17, 2019

(54) GENERATION OF SHARED SECRETS USING PAIRWISE IMPLICIT CERTIFICATES

(71) Applicant: Amazon Technologies, Inc., Seattle, WA (US)

(72) Inventors: Matthew John Campagna, Bainbridge Island, WA (US); Marguerite Marie Nathalie Delcourt, Renens (CH)

(73) Assignee: Amazon Technologies, Inc., Seattle, WA (US)

( * ) Notice: Subject to any disclaimer, the term of this patent is extended or adjusted under 35 U.S.C. 154(b) by 253 days.

(21) Appl. No.: 15/589,798

(22) Filed: May 8, 2017

(65) Prior Publication Data

US 2018/0324176 A1   Nov. 8, 2018

(51) Int. Cl.
*H04L 29/06* (2006.01)
*H04L 9/08* (2006.01)
*H04L 9/30* (2006.01)
*H04L 9/32* (2006.01)

(52) U.S. Cl.
CPC ........ *H04L 63/0823* (2013.01); *H04L 9/0838* (2013.01); *H04L 9/3066* (2013.01); *H04L 9/3268* (2013.01); *H04L 63/0435* (2013.01); *H04L 63/0442* (2013.01); *H04L 63/061* (2013.01); *H04L 63/0853* (2013.01)

(58) Field of Classification Search
CPC ............. H04L 63/0823; H04L 63/0442; H04L 63/061; H04L 63/0435; H04L 63/0853; H04L 9/3066; H04L 9/3268; H04L 9/0838

See application file for complete search history.

(56) References Cited

U.S. PATENT DOCUMENTS

| | | | | |
|---|---|---|---|---|
| 5,953,420 | A * | 9/1999 | Matyas, Jr. | H04L 9/0844 380/285 |
| 7,480,795 | B2 * | 1/2009 | Vanstone | H04L 9/3247 713/156 |
| 8,701,169 | B2 * | 4/2014 | Campagna | H04L 9/0841 380/30 |

(Continued)

FOREIGN PATENT DOCUMENTS

| | | |
|---|---|---|
| EP | 2495907 A1 | 9/2012 |
| WO | 2012108875 A1 | 8/2012 |
| WO | 2015184991 A1 | 12/2015 |

OTHER PUBLICATIONS

Sciancalepore, Savio, et al. "Key management protocol with implicit certificates for IoT systems." Proceedings of the 2015 Workshop on IoT challenges in Mobile and Industrial Systems. pp. 37-42. ACM, 2015. (Year: 2015).*

(Continued)

*Primary Examiner* — Kari L Schmidt
(74) *Attorney, Agent, or Firm* — Davis Wright Tremaine LLP

(57) ABSTRACT

Two parties to a communication establish public and private keys through the use of implicit certificates. Each party establishes a new static key pair, and determines a difference between the new static key pair and the previously established keys. The differences are exchanged and used to determine new public static keys. Each party generates an ephemeral key pair from the static key pair, and a shared secret is derived from a combination of the ephemeral keys and the new static keys.

21 Claims, 21 Drawing Sheets

(56) References Cited

U.S. PATENT DOCUMENTS

| | | | | |
|---|---|---|---|---|
| 9,246,675 | B2* | 1/2016 | Ding | H04L 9/0819 |
| 9,660,978 | B1 | 5/2017 | Truskovsky et al. | |
| 2002/0007457 | A1* | 1/2002 | Neff | H04L 9/006 |
| | | | | 713/180 |
| 2003/0145237 | A1 | 7/2003 | Chang et al. | |
| 2005/0193219 | A1* | 9/2005 | Vanstone | H04L 9/3247 |
| | | | | 726/5 |
| 2010/0023771 | A1* | 1/2010 | Struik | H04L 9/002 |
| | | | | 713/171 |
| 2011/0145585 | A1* | 6/2011 | Campagna | H04L 9/3263 |
| | | | | 713/176 |
| 2011/0307698 | A1* | 12/2011 | Vanstone | H04L 9/0825 |
| | | | | 713/171 |
| 2012/0221850 | A1* | 8/2012 | Struik | H04L 9/0844 |
| | | | | 713/156 |
| 2012/0233457 | A1* | 9/2012 | Zaverucha | H04L 9/0861 |
| | | | | 713/156 |
| 2012/0246465 | A1* | 9/2012 | Little | H04L 9/3066 |
| | | | | 713/156 |
| 2013/0046972 | A1 | 2/2013 | Campagna et al. | |
| 2013/0091362 | A1* | 4/2013 | Poeluev | H04L 9/0841 |
| | | | | 713/179 |
| 2013/0236019 | A1* | 9/2013 | Zaverucha | H04L 9/3263 |
| | | | | 380/278 |
| 2015/0288527 | A1* | 10/2015 | Vanstone | H04L 9/3268 |
| | | | | 713/156 |
| 2016/0352525 | A1* | 12/2016 | Antipa | H04L 9/3252 |
| 2017/0222802 | A1* | 8/2017 | Rubin | H04L 63/062 |
| 2019/0036689 | A1 | 1/2019 | Schiffman et al. | |

OTHER PUBLICATIONS

M. A. Muhal, X. Luo, Z. Mahmood and A. Ullah, "Physical Unclonable Function Based Authentication Scheme for Smart Devices in Internet of Things," 2018 IEEE International Conference on Smart Internet of Things (SmartIoT), Xi'an, 2018, pp. 160-165. (Year: 2018).*

J. W. Bos, C. Costello, M. Naehrig and D. Stebila, "Post-Quantum Key Exchange for the TLS Protocol from the Ring Learning with Errors Problem," 2015 IEEE Symposium on Security and Privacy, San Jose, CA, 2015, pp. 553-570. (Year: 2015).*

Postel, J., "User Datagram Protocol," Request for Comments: 768, ISI, Aug. 28, 1980, 5 pages.

Postel, J., "Transmission Control Protocol, DARPA Internet Program Protocol Specification," Information Science Institute University of Southern California, Request for Comments: 793, Sep. 1981, 161 pages.

Hollenbeck, S., "Transport Layer Security Protocol Compression Methods," Request for Comments: 3749, Standards Track, May 2004, 8 pages.

Dierks, T., and E. Rescorla, "The Transport Layer Security (TLS) Protocol Version 1.2," Request for Comments: 5246, Standards Track, Aug. 2008, 98 pages.

Campagna, M., "SEC 4: Elliptic Curve Qu-Vanstone Implicit Certificate Scheme (ECQV)," Standards for Efficient Cryptography, Version 1.0, Certicom Research, Jan. 24, 2013, 32 pages.

Lyubashevsky, V., et al., "On Ideal Lattices and Learning With Errors Over Rings," Proceedings of the 29th Annual International Conference on the Theory and Applications of Cryptographic Techniques—Advances in Cryptology—Eurocrypt 2010, May 30-Jun. 3, 2010, Monaco and Nice, France, Lecture Notes in Computer Science Book Series, vol. 6110, pp. 1-23.

Menezes, A.J., et al., "Handbook of Applied Cryptography," CRC Press LLC, Boca Raton, Florida, 1997, Chapter 2, "Mathematical Background," pp. 49-86.

Menezes, A.J., et al., "Handbook of Applied Cryptography," CRC Press LLC, Boca Raton, Florida, 1997, Chapter 12, "Key Establishment Protocols," pp. 489-541.

Menezes, A.J., et al., "Handbook of Applied Cryptography," CRC Press LLC, Boca Raton, Florida, 1997, Chapter 13, "Key Management Techniques," pp. 543-590.

"Quantum-Safe Cryptography (QSC); Quantum-Safe Algorithmic Framework," European Telecommunications Standards Institute Group Report QSC 001 V1.1.1, © 2016, 42 pages.

Regev, O., "On Lattices, Learning With Errors, Random Linear Codes, and Cryptography," Journal of the ACM 56(6):84-93, Article No. 34, Sep. 2009.

Wang, T., et al., "Efficient Signature Schemes From R-LWE," IACR Cryptology ePrint Archive, 2015, 16 pages.

Zhi-Min, Y., et al., "Diffie-Hellman Key Exchange Protocol Based on Ring-LWE," The Open Cybernetics & Systemics Journal 9:1033-1037, 2015.

International Search Report and Written Opinion dated Jul. 3, 2018, International Patent Application No. PCT/US2018/030527, filed May 1, 2018, 14 pages.

* cited by examiner

GENERATION OF SHARED SECRETS USING PAIRWISE IMPLICIT CERTIFICATES

CROSS REFERENCE TO RELATED APPLICATIONS

This application incorporates by reference for all purposes the full disclosure of co-pending U.S. patent application Ser. No. 15/589,783, filed May 8, 2017, entitled "IMPLICIT CERTIFICATES USING RING LEARNING WITH ERRORS" and co-pending U.S. patent application Ser. No. 15/589,808, filed May 8, 2017, entitled "COMMUNICATION PROTOCOL USING IMPLICIT CERTIFICATES."

BACKGROUND

Modern computing systems may be used to maintain financial information, medical information, personal information, and other important information. In many examples, access to this important information is controlled in accordance with a set of access policies that are established by administrators, data owners, or other responsible entities. One of the ways in which access is controlled is through the use of digital certificates and encryption. A digital certificate allows one party to confirm, to a reasonable degree, the identity of another entity. Encryption allows data to be protected using an encryption key such that entities without access to a corresponding decryption key are unable to access the data.

Many cryptographic techniques rely on asymmetric mathematical problems that are easy to create but difficult to solve. It is possible that advances in technology may solve, or even render trivial, a problem that was once thought to be difficult to solve. Therefore, developing stronger cryptographic techniques is an ongoing problem that is important to maintaining our data security.

BRIEF DESCRIPTION OF THE DRAWINGS

Various techniques will be described with reference to the drawings, in which.

DETAILED DESCRIPTION

Figure 1:
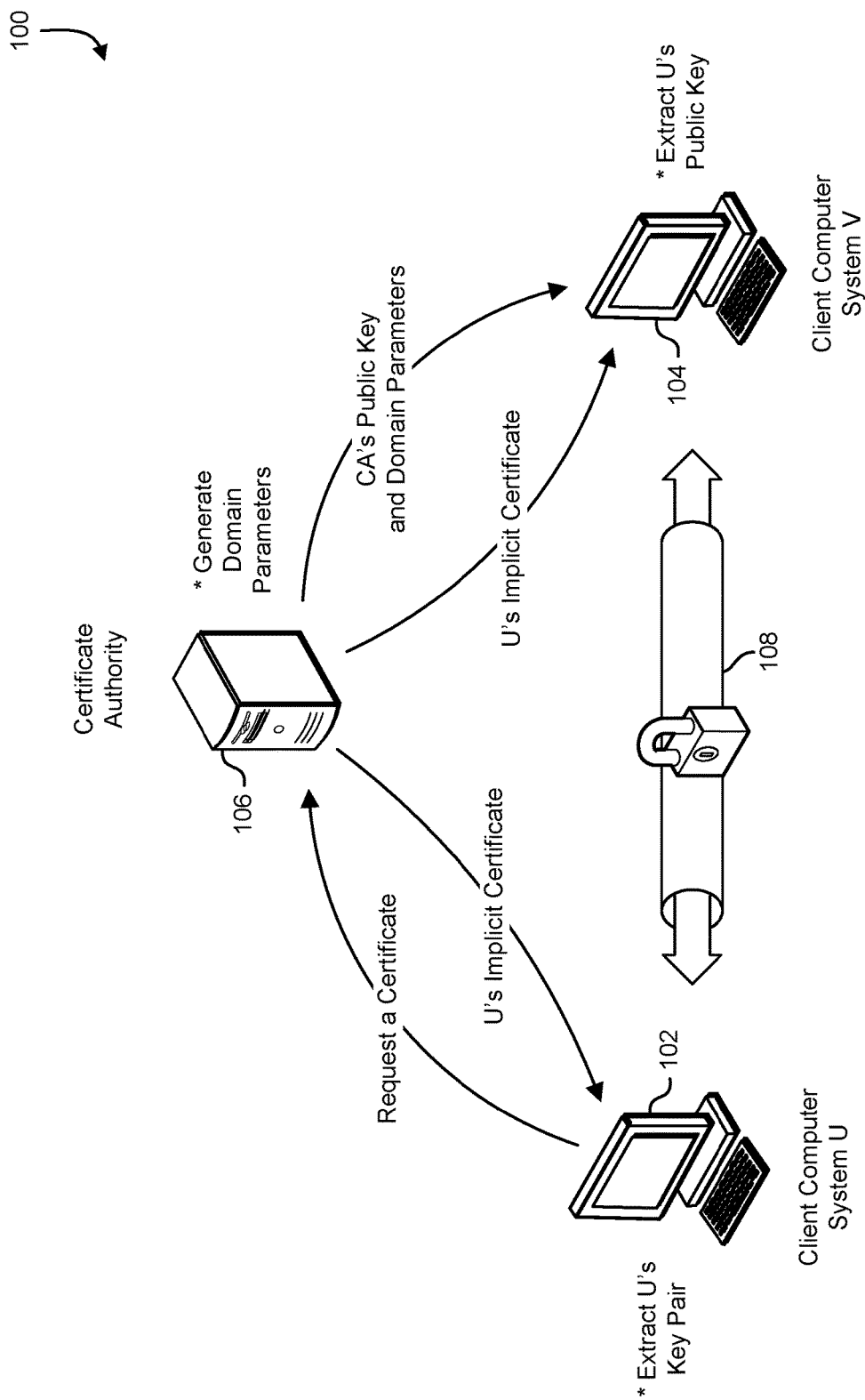
FIG. 1 shows an illustrative example of an environment in which various embodiments may be practiced.

The present document describes systems and methods that generate and use implicit certificates capable of being used for protected communications. The implicit certificates are provided for ring learning with errors ("RLWE") public keys that are, in some examples, resistant to quantum-based computing attacks. Various methods are described that request, generate, verify, and use the implicit certificates. In some examples, the system provides an implicit certificate that enables communication between two specific parties that are identified at the time of certificate generation. In another example, the system provides a certificate that may be used to communicate with a variety of different parties. Various examples allow the system to be used as a signature scheme, a key-exchange protocol, or a certificate-based system that establishes protected communication between two parties (U and V) using a number of shared CA computations. In the present document, various entities are assigned a unique identifier for the purpose of discussion. For example, an identifier such as 'U' or 'V' or 'CA' may be used as shorthand to identify a first entity, a second entity, and a certificate authority respectively. An entity may be a party to a message exchange such as a computer system, networked device, computer server, or computer-implemented service.

An important part of public key cryptography is establishing the authenticity of public keys. In some examples, the authenticity of a public key is assured through a signing authority or certificate authority ("CA"). The role of the CA is to confirm the authenticity of public keys by binding the identity of an entity to the identity's public key. In some implementations, the CA accomplishes this through the use of a digital signature. A data structure that accomplishes this binding is called a digital certificate. In various implementations, the CA confirms the identity of a particular entity, and confirms that the particular entity is in possession of a private key, as a condition of issuing, to the particular entity, a certificate that binds the identity to a corresponding public key.

For certificates such as X.509 certificates, the link between an entity U and an associated public key is confirmed by verifying a CA's signature in the certificate. In some examples, confirmation that the entity U is able to access the corresponding private key is obtained during cryptographic usage of the public key. In another example, a certificate issuance protocol has U prove knowledge of a secret key to CA as a condition of issuing an associated certificate. As a result, another user V has indirect assurance that U has access to the secret key if the certificate is valid because the CA explicitly performs this check when the certificate is issued.

An implicit certificate generation algorithm yields a public key purportedly bound to U (i.e., purportedly issued by a CA). Confirmation that the public key is bound to U is obtained after use of the corresponding private key. For example, confirmation that the public key is bound to U may be obtained as a result of performing an authenticated key agreement scheme involving the public key. Therefore, with implicit certificates, the binding of an entity and its associated public key, and verified access to the private key, are verified in unison as a result of successful key use. In various embodiments, implicit certificates are smaller and use less computing resources when compared to other types of explicit digital certificates. For example, the elliptic curve Qu-Vanstone (ECQV) certificate scheme provides a certificate that is the size of a point on an elliptic curve, thereby reducing the amount of network bandwidth used when compared to conventional x.509 certificates.

Using elliptic curves, an implicit certificate scheme can be used to establish a set of cryptographic keys for communication between two entities, U and V. A Certificate Authority ("CA") confirms the identity of U and issues a certificate that binds identifying information associated with U to a public key owned by U. U generates a cryptographic key $k_U$. U requests an implicit certificate by determining the following, where G is a base point generator:

$$k_U \in_R [1 \ldots n-1]$$

$$R_U := k_U \cdot G$$

U then sends the Request (RU) and identifying information (U) to the CA. The CA confirms the identity of U using the supplied identifying information. If the CA determines that the identity of U matches the supplied identifying information, the CA processes the request and produces an implicit certificate as follows:

$$k \in_R [1, \ldots, n-1]; P_U = R_U + k_G$$

$$\text{Cert}_U := \text{Encode}(P_U, U, \times)$$

$$e = H_n(\text{Cert}_U)$$

$$r := ek + d_{CA} (\bmod n)$$

The CA then returns the certificate ($\text{Cert}_U$) and r to U. U is able to extract the key pair as follows where $d_U$ is U's private key and $Q_U$ is U's public key:

$$e := H_n(\text{Cert}_U)$$

$$d_U := ek_U + r (\bmod n)$$

$$Q_U := eP_U + Q_{CA}$$

Another entity V may process the certificate produced by the CA to retrieve U's public key $P_U$ using similar information provided by the CA. In some examples, an entity V may determine U's public certificate using the certificate $\text{Cert}_U$, the hash function H( ), the information that identifies U ($P_U$), and the public key of the certificate authority ($Q_{CA}$). In general, these parameters may be obtained from the certificate authority. Additional information describing elliptic curve implicit certificates may be found at "SEC 4: Elliptic Curve Qu-Vanstone Implicit Certificate Scheme (ECQV)," The Standards for Efficient Cryptography Group, Jan. 24, 2013, by Matthew Campagna, which is incorporated herein by reference for any purpose.

In general, digital certificates that bind an identity to a public key provide at least two aspects of certification. The first certification is a verifiable link between an identity and an associated public key. The second certification is a verifiable assurance that the entity has access to an associated secret key. An implicit certificate scheme may define one or more operations including:

An ECQV-setup operation where a CA establishes elliptic curve domain parameters, a hash function, a certificate encoding format, and parties to the communication select a random number generator. The CA generates a public/private key pair. The parties receive authentic copies of the CA's public key and domain parameters.

A certificate-request operation where U generates a request for a certificate and the request is sent to the CA. The cryptographic component of the request is a public key, generated using an equivalent procedure to the key generation procedure used by the CA during setup.

A certificate-generation operation that is performed by a CA as a result of receiving a certificate request from an entity U. The CA confirms U's identity using identifying information provided by U with the certificate request, and creates an implicit certificate. The CA provides the implicit certificate to U.

A public key extraction operation that is performed by a sending entity V to acquire a public key for a destination entity U. A certificate authority provides V with an implicit certificate for U, domain parameters associated with the certificate, and the certificate authority's public key using this information, the public key extraction operation determines U's public key, and V may use the public key for encrypting messages that are sent to U.

A certificate reception operation performed when a new implicit certificate is provided to an entity U from a CA. Using information provided by the CA, U determines the implicitly certified public and private keys. In some examples, U confirms that the keys are valid.

A certificate verification operation performed by an entity to verify an implicit certificate using additional information that forms an explicit signature on the digital certificate. Using an explicit signature feature allows an entity V to confirm the binding between an entity U and an associated public key prior to key use. An implicit certificate augmented with additional information forms an explicit signature that may be used in contexts where the assurances of conventional certificate processing are desirable. In some examples, the implicit certificate scheme may provide verification that the certificate requester is in possession of an associated private key.

The present document describes examples of implicit certificates using cryptographic schemes based at least in part on the Ring Learning with Errors ("RLWE") problem. Additional information relating to the learning with errors ("LWE") and RLWE problems may be found at "On ideal lattices and learning with errors over rings," V. Lyubashevsky, C. Peikert and O. Regev in Advances in Cryptology—Eurocrypt 2010, 29th Annual International Conference on the Theory and Applications of Cryptographic Techniques, Proceedings. (Vol. 6110 LNCS, pp. 1-23). (Lecture Notes in Computer Science (including subseries Lecture Notes in Artificial Intelligence and Lecture Notes in Bioinformatics); Vol. 6110 LNCS) which is incorporated herein by reference in its entirety for any purpose.

In various examples, an implicit certificate scheme is provided that uses ideal lattices. The ring learning with errors ("RLWE") problem is used to derive a fast solution. A requester (U) provides a certificate request to a certificate authority (CA) to issue an implicit certificate from which the requester (U) will be able to derive an associated private/public key pair. A certificate user (V) is able to derive U's public key using the implicit certificate and the CA's public key. A certificate-issuance procedure is described as follows as a protocol between U and CA. The binding of an entity and an associated public key and knowledge of the private key are verified in unison as a result of key usage.

Using ideal lattices, an implicit certificate scheme can be used to establish a set of cryptographic keys for communication between two entities, U and V. A Certificate Authority ("CA") confirms the identity of U and issues a certificate that binds identifying information associated with U to a public key owned by U. U requests an implicit certificate by determining:

$$r \leftarrow R_Q, e_3 \leftarrow \chi$$

$$R_U := Ar + e_3$$

A is the established domain polynomial and $R_Q$ is a ring of integers. In some examples, both A and $R_Q$ are provided to U by the certificate authority CA. After generating the request, U sends the Request ($R_U$) and identifying information (U) to the CA. The CA confirms the identity of U using the supplied identifying information. If the CA determines that the identity of U matches the supplied identifying information, the CA processes the request and produces an implicit certificate as follows:

$$k \leftarrow R_q, e_4 \leftarrow \chi$$

$$P_U = R_U A k - e_4 \ (P_U \text{ is a public intermediate})$$

$$\text{Cert}_U := \text{Encode}(P_U, U)$$

$$s := c + H(\text{Cert}_U) k + e_1$$

The CA then returns the certificate ($\text{Cert}_U$) and the private value (s) to U. U is able to extract the key pair as follows where $d_U$ is U's private key and $Q_U$ is U's public key:

$$d_U := s + H(\text{Cert}_U) r$$

$$Q_U := C + H(\text{Cert}_U) P_U$$

FIG. 1 shows an illustrative example of an environment in which various embodiments may be practiced. A diagram 100 illustrates a system in which an implicit certificate is generated and used by a number of parties. The system includes a first computer system 102 (U), a second computer system 104 (V), and a certificate authority 106 (CA). In various examples, the client computer systems may be computer servers, cluster servers, virtual machines, computer-implemented services, or other entities able to be associated with communication endpoints. In additional examples, the client computer systems may include a crypto processor, hardware security module, or application-specific integrated circuit ("ASIC") for performing the operations described herein. The certificate authority 106 may be a computer server, server cluster, or service that is trusted by the first computer system 102 and the second computer system 104. In some examples, the certificate authority 106 is a computer server operated by a certificate issuer that is trusted to verify the identity of other entities that request implicit certificates. The diagram 100 illustrates a process whereby an implicit certificate is generated and the corresponding public/private cryptographic key pair is generated for the first computer system 102. The second computer system 104 acquires a public key associated with the first computer system 102 using information provided by the certificate authority 106.

The parties to the communication and the certificate authority perform a setup operation where they agree on a number of parameters that are used to generate the certificates. The parameters are communicated publicly among the parties. As part of the set-up operation, the parties establish a ring of integers $R_q$, and an error distribution $\chi$ over $R_q$. In some examples, a hash function is identified for later use by the parties. The certificate authority 106 performs the following operations to produce a private/public key pair (c, C) and a domain polynomial A.

| | |
|---|---|
| Sample $c \leftarrow R_q$ and $e_1, e_2 \leftarrow \chi$ | 1. |
| Generate $A \leftarrow R_q$ | 2. |
| Compute $C = Ac + Ae_1 + e_2$ | 3. |

After performing the above steps, the certificate authority 106 provides the private/public key pair (c, C) and the domain polynomial A to the first computer system 102 and the second computer system 104. In some implementations, the set of parameters is predetermined and distributed to the parties through an off-line mechanism such as hard coding at manufacture time.

After the setup operations are complete, the first computer system 102 begins the process by requesting a certificate from the certificate authority 106. A request RU is generated as follows:

| | |
|---|---|
| Sample $r \leftarrow R_q$ and $e_3 \leftarrow \chi$ | 1. |
| Compute request $R_U = Ar + e_3$ | 2. |

The resulting request $R_U$ is sent to the certificate authority 106 along with information that identifies the first computer system 102 (U).

The certificate authority 106 receives the request $R_U$ and the identifying information U from the first computer system 102. The certificate authority 106 examines the identifying information and confirms the identity of the requester and the accuracy of the identifying information U. If the identifying information matches the identity of the first computer system 102, the certificate authority 106 generates an implicit certificate for the first computer system 102 as follows:

Sample $k \leftarrow R_q$      1.

Compute $P_U = R_U + Ak - e_4$      2.

Create certificate $\text{Cert}_U = (P_U, U)$      3.

Compute $s = c + H(\text{Cert}_U)k + e_1$      4.

The certificate $\text{Cert}_U$ is sent to the first computer system 102 along with s so that the first computer system 102 is able to determine a corresponding private/public key using a public key associated with the certificate authority 106. The certificate authority sends the certificate $\text{Cert}_U$ to the second computer system 104 which is then also able to compute the public key of the first computer system 102 using the certificate authority's public key. The second computer system 104 is able to infer that the first computer system 102 did not forge a certificate because the second computer system 104 is able to determine the first computer system's public key using information received from the certificate authority 106, and not information provided directly by the first computer system 102.

In an example, the second computer system 104 acquires the certificate associated with the first computer system 102, and using the public key of the certificate authority 106, the second computer system 104 determines the public key of the first computer system 102 as follows:

$$Q_U = C + H(\text{Cert}_U)P_U$$

$$= A(c + H(\text{Cert}_U)(r+k) + e_1) + e_2 + H(\text{Cert}_U)(e_3 - e_4)$$

$$= A(c + H(\text{Cert}_U)(r+k) + e_1) + E, \text{ with } E = e_2 + H(\text{Cert}_U)(e_3 - e_4)$$

The value $Q_U$ is the public key of the first computer system 102.

After receiving the certificate $\text{Cert}_U$ from the certificate authority 106, the first computer system 102 uses the certificate authority's public key to determine a private/public key pair.

Compute $d_U = s + H(\text{Cert}_U)r = c + H(\text{Cert}_U)(r+k) + e_1$      1.

Compute $Q_U = C + H(\text{Cert}_U)P_U = Ad_U + E$      2.

Verify that $(Q_U - A \times d_U) = E$ is equal to a small error term      3.

The computed tuple $(d_U, Q_U)$ is U's private/public key pair.

In some implementations, the certificate is augmented with additional information that forms an explicit signature on the certificate $\text{Cert}_U$. The signature on the certificate may be verified by computing $H(\text{Cert}_U)(P_U - R_U) - (As - C)$, and verifying that the coefficients of the result are small error values. If the certificate is invalid, the polynomial will have coefficients that are spread over $R_Q$.

In some examples, the key generation method creates public key pairs in which an implicit certificate is embedded that binds an entity to a certificate and/or binds a communication between two entities to a certificate. Key generation is augmented by multiplying the associated error terms by a prime number p that remains consistent throughout the protocol. The obtained keys are of the form:

$$d_U = s + H(\text{Cert})r = c + H(\text{Cert})(r+k) + pe_1$$

$$Q_U = A \times d_U + pe_2 + H(\text{Cert})(pe_3 - pe_4)$$

A party may use its cryptographic keys in a number of ways. In some examples, the party uses its private cryptographic key to generate a digital signature for a message. The digital signature may be provided with the message to another party, and the other party is able to verify the signature using the party's public cryptographic key. In another example, a protected communication channel 108 is established between the first computer system 102 and the second computer system 104. Information transmitted over the communication channel 108 is encrypted. To send a message, the sender encrypts the message with its private cryptographic key and sends the resulting encrypted message to a recipient. The recipient decrypts the encrypted message using the sender's public key to reveal the original message.

Figure 2:
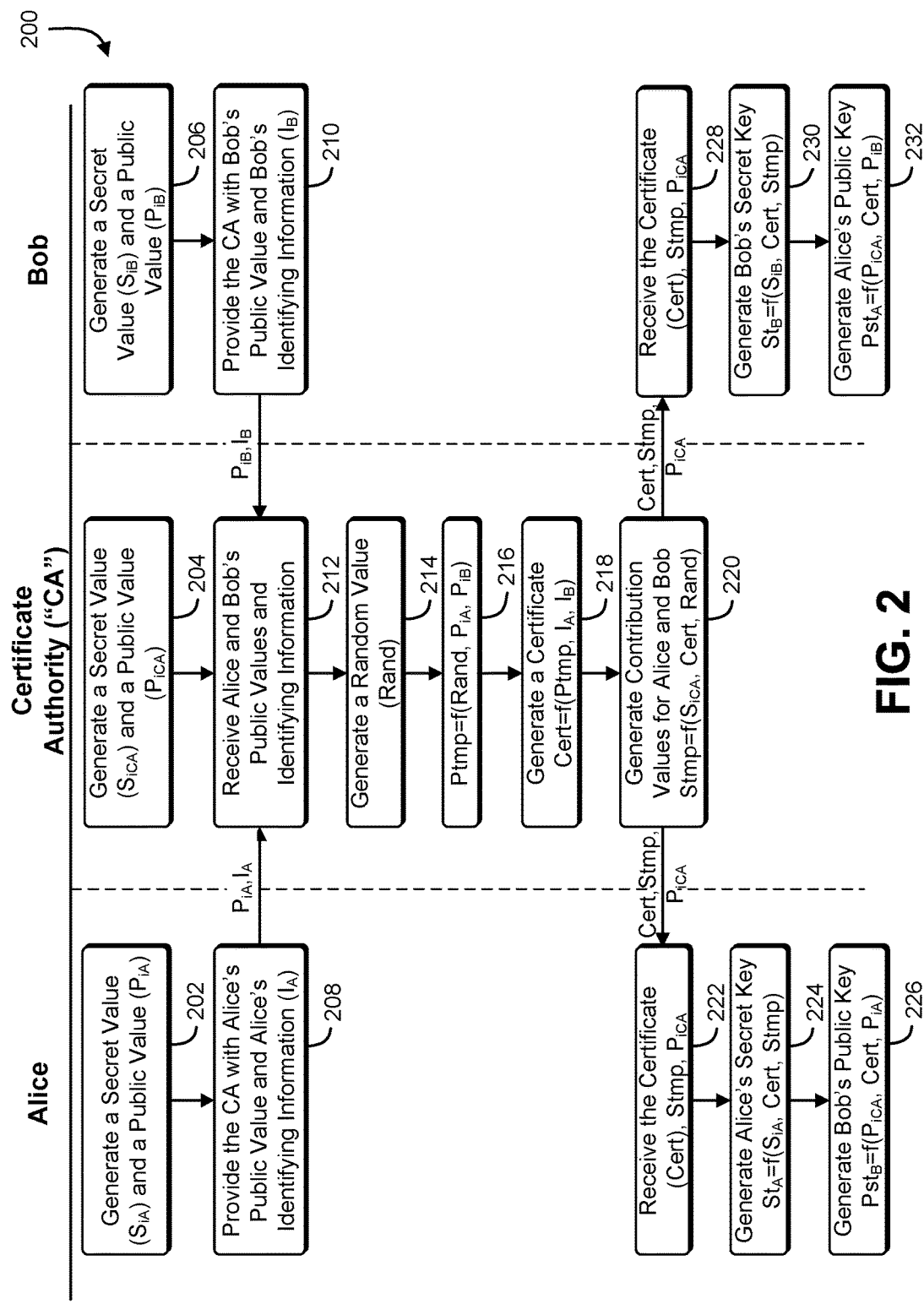
FIG. 2 shows an illustrative example of a process that, as a result of being performed by two entities and a certificate authority ("CA"), generates cryptographic key pairs for each entity using an implicit certificate.

FIG. 2 shows an illustrative example of a process that, as a result of being performed by two entities and a certificate authority ("CA"), generates cryptographic key pairs for each entity using an implicit certificate. The process illustrates methods of providing implicit certificates bound to RLWE public keys which are usable to establish communication between two entities, identified as Alice and Bob. In various implementations, the entities are computer systems, services, mobile devices, cellular devices, network-connected sensors, network appliances, or other communicating entities. In various examples, the certificate does not facilitate communication between parties other than the two entities.

A swim diagram 200 illustrates a process that begins with initialization of values by two parties to a communication and a certificate authority. At block 202 a first entity identified as Alice(U) generates a secret value $S_{iA}$ (r) and a public value $P_{iA}(R_U)$.

$r \leftarrow Rq, e_4 \leftarrow \chi$      1.

$R_U := Ar + e_3$      2.

At block 204, the certificate authority generates a secret value $\text{Si}_{CA}$ (c) and a public value $\text{Pi}_{CA}(C)$.

$CA(c, C = Ac + Ae_1 + e_2)$      1.

At block 206, the second entity known as Bob(V) generates a secret value $S_{iB}$ (t) and a public value $P_{iB}$.

$t \leftarrow Rq, e_4 \leftarrow \chi$      1.

$R_v := At + e_4$      2.

At block 208, Alice provides the certificate authority with Alice's public value $P_{iA}$ and information that identifies Alice $I_A$. The information that identifies Alice may be a name, an identifier, an address, a domain name, or other information associated with Alice. At block 210, Bob provides the certificate authority with Bob's public value $P_{iB}$ and information that identifies Bob $I_B$. The information that identifies Bob may be a name, identifier, an address, a domain name, or other information associated with Bob.

At block 212, the certificate authority receives information from Alice and Bob, and verifies the identifying information. In some examples, the certificate authority verifies the identifying information with an authority responsible for Alice and Bob, respectively. If the certificate authority is unable to verify the identifying information provided by either Alice or Bob, the certificate authority will not generate and issue a certificate. If the certificate authority is able to verify the identifying information provided by Alice and Bob, the process advances to block 214 and the certificate authority begins the process of generating a certificate that will allow Alice and Bob to communicate with each other. At block 214, the certificate authority generates a random value (Rand or k) to be used in the certificate generation process.

$$k \leftarrow R_q$$

At block 216, the certificate authority generates a temporary value (Ptmp) that is a function of the random value (Rand), Alice's identifying information $I_A$, and Bob's identifying information b.

$$P = R_U + R_V + Ak - e_5$$

At block 218, the certificate authority generates the certificate (Cert) using the temporary value (Ptmp), Alice's identifying information $I_A$, and Bob's identifying information $I_B$.

$$\text{Cert} := \text{Encode}(P, U, V)$$

The certificate authority generates 220 a specific contribution value (Stmp) that is a function of the certificate authority's secret value $S_{iCA}$, the certificate (Cert), and the random number (Rand).

$$\text{Stmp} := c + H(\text{Cert})k + e_1$$

The certificate, the specific contribution value (Stmp), and the random number (Rand), are provided to both Alice and Bob.

At block 222, Alice receives the certificate (Cert), the secret value (Stmp), and the public value of the certificate authority $P_{iCA}$, which allows Alice to generate a secret and public key pair. At block 224, Alice generates Alice's secret key ($St_A$) from Alice's secret value ($S_{iA}$), the certificate (Cert), and the specific contribution value (Stmp).

$$d_U := s + H(\text{Cert})r$$

At block 226, Alice generates Bob's public key ($Pst_B$) from the public value of the certificate authority ($S_{iCA}$), the certificate (Cert), and Alice's public value ($P_{iA}$).

$$Q_V := C + H(\text{Cert})P - R_U$$

At block 228, Bob receives the certificate (Cert), the secret value (Stmp), and the public value of the certificate authority $P_{iCA}$, which allows Bob to generate a secret and public key pair. At block 230, Bob generates Bob's secret key ($St_B$) from Bob's secret value ($S_{iB}$), the certificate (Cert), and the specific contribution value (Stmp).

$$d_V := s + H(\text{Cert})t$$

At block 232, Bob generates Alice's public key ($Pst_A$) from the public value of the certificate authority ($S_{iCA}$), the certificate (Cert), and Bob's public value ($P_{iB}$).

$$Q_U := C + H(\text{Cert})P - R_V$$

In some examples, two entities Alice and Bob establish certified key pairs while performing fewer computations than would be required as a result of performing the key issuance procedure for each entity separately. In order for entities Alice and Bob to communicate, both Alice and Bob send a request to a CA which returns a unique certificate with additional information from which Alice and Bob are able to determine their corresponding private keys and each other's public key. The certificate is not bound to a single participant but is instead bound to a communication between the two entities Alice and Bob. An implementation of the process of generating an implicit certificate binding the communication between Alice and Bob is illustrated with the following python code:

```
#function that performs the CA's computation for both Alice and Bob
def RLWEQV_CA_comp_double(a,Ra,Rb,e1,c,R_q,D):
    #CA computations
    k=R_q.random_element( )
    e3=D( )
    P=R_q(Ra+Rb+a*k-e3)
    H=R_q(DiscreteGaussianDistributionPolynomialSampler(ZZ['x'], 1024, 3.192)( ))
    #dummy value used as the hash of the certificate, it does not matter for correctness that it
    #is a dummy value but it has to remain consistent all along
    s=R_q(c+H*k+e1) #s and P are sent to both Alice and Bob
    return (H,P,s)
#function that performs the computations of one participant to compute an
#associated public key pair
def RLWEQV_key_comp_double(s,H,r,R,P,C,R_q):
    #final keypairs computations
    d=R_q(s+H*r) #certified private key of one participant
    Q=R_q(C+H*P-H*R) #certified public key of the other participant
    return (d,Q)
#function that creates the public key pairs of both entities
def RLWEQV_keyGen_double( ):
    #Domain parameters
    (R_q,a,D)=RLWEQV_Setup( )
    #CA parameters
    (e1,c,C)=RLWEQV_CA_param(a,R_q,D)
    #requests computations
    (Ra,ra)=RLWEQV_Request(a,R_q,D) #Alice's public request and secret random value
    (Rb,rb)=RLWEQV_Request(a,R_q,D) #Bob's public request and secret random value
    #CA computations
    (H,P,s)=RLWEQV_CA_comp_double(a,Ra,Rb,e1,c,R_q,D) #CA computation of
    certificate and temporary values
    #final keypairs computations
    (da,Qa)=RLWEQV_key_comp_double(s,H,ra,Rb,P,C,R_q) #Alice's certified private and
    public key pair
    (db,Qb)=RLWEQV_key_comp_double(s,H,rb,Ra,P,C,R_q) #Bob's certified private and
    public key pair
```

```
return (da,Qa,db,Qb,R_q,a,D)
#function that tests the correctness of the certificate and keys
def RLWEQV_double(numberOfTests):
#to test that final error terms are small as expected
la=[ ]
lb=[ ]
i=0
while i< numberOfTests:
(da,Qa,db,Qb,R_q,a,D)=LWEQV_keyGen( )
i+=1
#For the test
val1=1073741827 #q/4
val2=3221225483 #3q/4
errora=R_q((Qa-a*da))#error term of the obtained public key for Alice
errorb=R_q((Qb-a*db))
countRa=0 #count number of coefficients of the error that are not small as expected
for j in vector(errora):
if j>val1 and j<val2:
countRa+=1
la.append(countRa)
countb=0
for k in vector(errorb):
if k>val1 and k<val2:
countb+=1
lb.append(countb)
print numerical_approx(max(la))    #prints the maximum number of error coefficients
                                   # that are not small as expected over numberOfTests
                                   # tests, if it works it should print an exact 0
print numerical_approx(max(lb))
```

Figure 3:
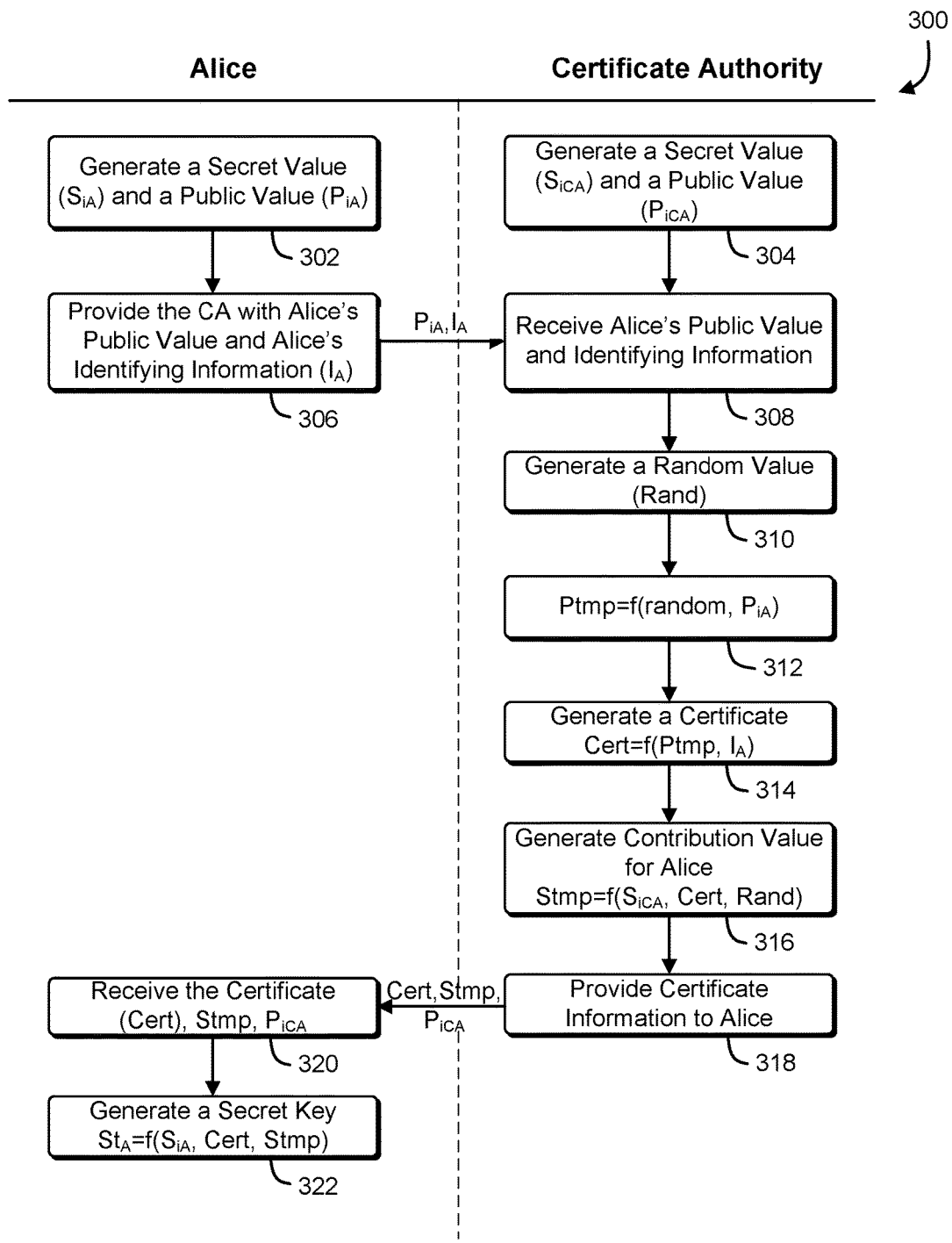
FIG. 3 shows an illustrative example of a process that, as a result of being performed by an entity and a certificate authority, generates a cryptographic key pair and an implicit certificate for the entity.

FIG. 3 shows an illustrative example of a process that, as a result of being performed by an entity named Alice and a certificate authority, generates a cryptographic key pair and an implicit certificate for the entity. The process illustrates a method of providing an implicit certificate bound to RLWE public keys which are usable to establish communication between an entity and various other entities. In the example shown, the entity is identified as Alice. In various implementations, the entities are computer systems, services, mobile devices, cellular devices, network-connected sensors, network appliances, or other communicating entities.

A swim diagram 300 illustrates a process that begins with initialization of values by two parties to a communication and a certificate authority. At block 302, a first entity that identified as Alice generates a secret value $S_{iA}$ and a public value $P_{iA}$. At block 304, the certificate authority generates a secret value $Si_{CA}$ and a public value $Pi_{CA}$. At block 306, Alice provides the certificate authority with Alice's public value $P_{iA}$ and information that identifies Alice $I_A$. The information that identifies Alice may be a name, an identifier, an address, a domain name, or other information associated with Alice.

At block 308, the certificate authority receives information from Alice and verifies the identifying information. In some examples, the certificate authority verifies the identifying information with an authority responsible for the operation of the Alice entity. If the certificate authority is unable to verify the identifying information provided by Alice, the certificate authority will not generate and issue a certificate. If the certificate authority is able to verify the identifying information provided by Alice, the process advances to block 310 and the certificate authority begins the process of generating a certificate that will allow Alice to communicate with other entities. At block 310, the certificate authority generates a random value (Rand) to be used in the certificate generation process. At block 312, the certificate authority generates a temporary value (Ptmp) that is a function of the random value (Rand) and Alice's identifying information $I_A$. At block 314, the certificate authority generates the certificate (Cert) using the temporary value (Ptmp) and Alice's identifying information $I_A$. The certificate authority generates 316 a specific contribution value (Stmp) that is a function of the certificate authority's secret value $S_{iCA}$, the certificate (Cert), and the random number (Rand). The certificate, the specific contribution value (Stmp), and the random number (Rand) are provided 318 to Alice.

At block 320, Alice receives the certificate (Cert), the secret value (Stmp), and the public value of the certificate authority $P_{iCA}$, which allows Alice to generate a secret and public key pair. At block 322, Alice generates Alice's secret key ($St_A$) from Alice's secret value ($S_{iA}$), the certificate (Cert), and the specific contribution value (Stmp). Other entities may generate Alice's public key by acquiring the Certificate (Cert), the specific contribution value (Stmp), and the public value $P_{iCA}$ from the certificate authority, and then generating Alice's public key ($Pst_A$) from the public value of the certificate authority ($S_{iCA}$) and the certificate (Cert).

An example of python code that performs the above process is shown below:

```
#function that generates a public key pair with implicit certificate
def RLWEQV_keyGen( ):
#Domain parameters
(R_q,a,D)=RLWEQV_Setup( )
#CA parameters
(e1,c,C)=RLWEQV_CA_param(a,R_q,D)
#request computations
```

```
(R,r)=RLWEQV_Request(a,R_q,D) #public request and secret random value
#CA computations
(H,P,s)=RLWEQV_CA_comp(a,R, e1,c,R_q,D) #CA computation of certificate and
temporary values
# key pair computations
(d,Q)=RLWEQV_key_comp(s,H,r,P,C,R_q) #certified private and public key pair
return (d,Q,R_q,a,D)
```

Figure 4:
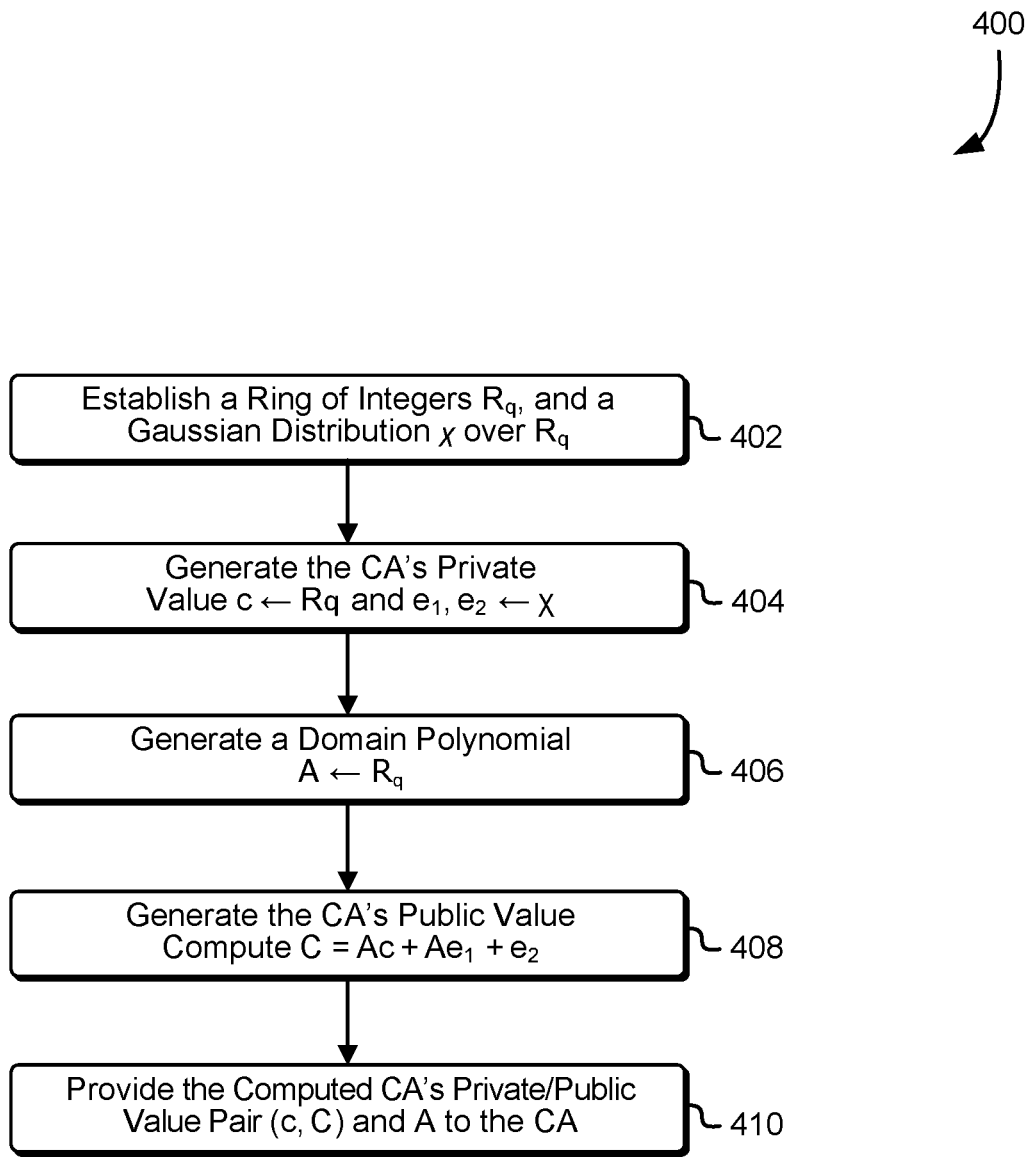
FIG. 4 shows an illustrative example of a process that, as a result of being performed by a certificate authority, generates parameters used for generating an implicit certificate using Ring Learning With Errors ("RLWE")

FIG. 4 shows an illustrative example of a process that, as a result of being performed by a certificate authority, generates parameters used for generating an implicit certificate using Ring Learning With Errors ("RLWE"). A flowchart 400 illustrates a process that begins at block 402 with the certificate authority establishing a ring of integers $R_q$ and a Gaussian distribution $\chi$ over $R_q$. At block 404, the certificate authority generates a private value for the CA c from the ring of integers $R_q$. Two samples are taken which produce two error terms $e_1$ and $e_2$ within the distribution $\chi$. At block 406, the certificate authority generates a domain polynomial A from the ring of integers $R_q$. At block 408, the certificate authority generates a public value for the certificate authority using the two error terms $e_1$ and $e_2$, the private value for the CA c, and the domain polynomial A. At block 410, the private and public values associated with the CA (c,C), and the domain polynomial A, are provided to the certificate authority. In some implementations, the certificate authority itself determines the domain parameters and is in possession of the domain parameters after the operations associated with block 408 are performed. In other implementations, a trusted third party determines the domain parameters, and the domain parameters are provided to the certificate authority over a trusted communication channel. In yet another implementation, the domain parameters are determined by a manufacturer and programmed into a device that acts as a certificate authority during manufacturing.

The process illustrated in FIG. 4 may be implemented using the following code written in python. The function RLWEQV establishes parameters and generates a public key pair (d; Q) and verifies that the resulting error terms in the public keys are appropriately small.

```
from sage.stats.distributions.discrete_gaussian_polynomial import
DiscreteGaussianDistributionPolynomialSampler
#function that creates the domain parameters for the implicit certificate scheme
def RLWEQV_Setup( ):
#Domain parameters
q=next_prime(2**32)
D = DiscreteGaussianDistributionPolynomialSampler(ZZ['x'], 1024, 3.192)
K = IntegerModRing(q)
R_q = K['x'].quotient(x^1024+1, 'x')
a=R_q.random_element( )
return (R_q,a,D)
#function that determines the CA's public/private key pair
def RLWEQV_CA_param(a,R_q,D):
#CA parameters
c=R_q.random_element( )
e1=D( )
e4=D( )
C=R_q(a*c+a*e1+e4)
return (e1,c,C)
```

Figure 5:
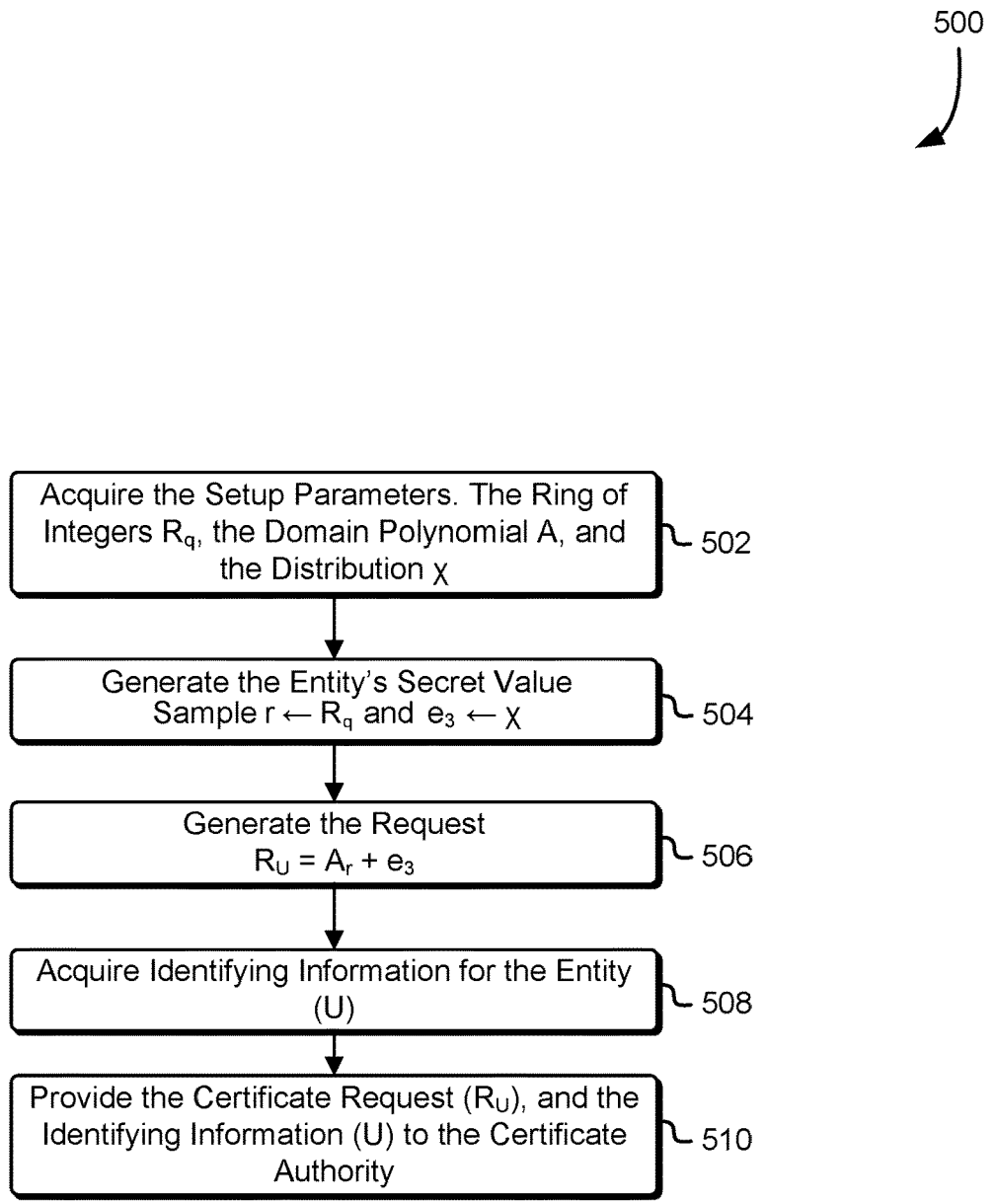
FIG. 5 shows an illustrative example of a process that, as a result of being performed by an entity, generates a request for an implicit certificate using Ring Learning With Errors.

FIG. 5 shows an illustrative example of a process that, as a result of being performed by an entity, generates a request for an implicit certificate using Ring Learning With Errors. A flowchart 500 illustrates a process that begins at block 502 with the entity acquiring a set of domain parameters. In some implementations, the domain parameters are provided by a certificate authority. The domain parameters include a ring of integers $R_q$, a domain polynomial A, and the distribution $\chi$.

At block 504, the entity determines a secret value r from the ring of integers $R_q$, and determines an associated error value $e_3$ that is in accordance with the distribution x. At block 506, the entity generates the request $R_U$ based on the polynomial and the error value $e_3$. At block 508, the entity acquires a set of identifying information U. In some implementations, the identifying information is a name, address, identifier, or network address associated with the entity. At block 510, the entity submits the request by providing the request $R_U$ and the identifying information U to the certificate authority.

Generation of the certificate request may be implemented using the following code implemented in Python:

```
#function that creates the certificate request to be sent to the CA
def RLWEQV_Request(a,R_q,D):
#requests computations
r=R_q.andom_element( ) #secret
e2=D( )
R=R_q(a*r+e2) #request sent to the CA
return (R,r)
```

Figure 6:
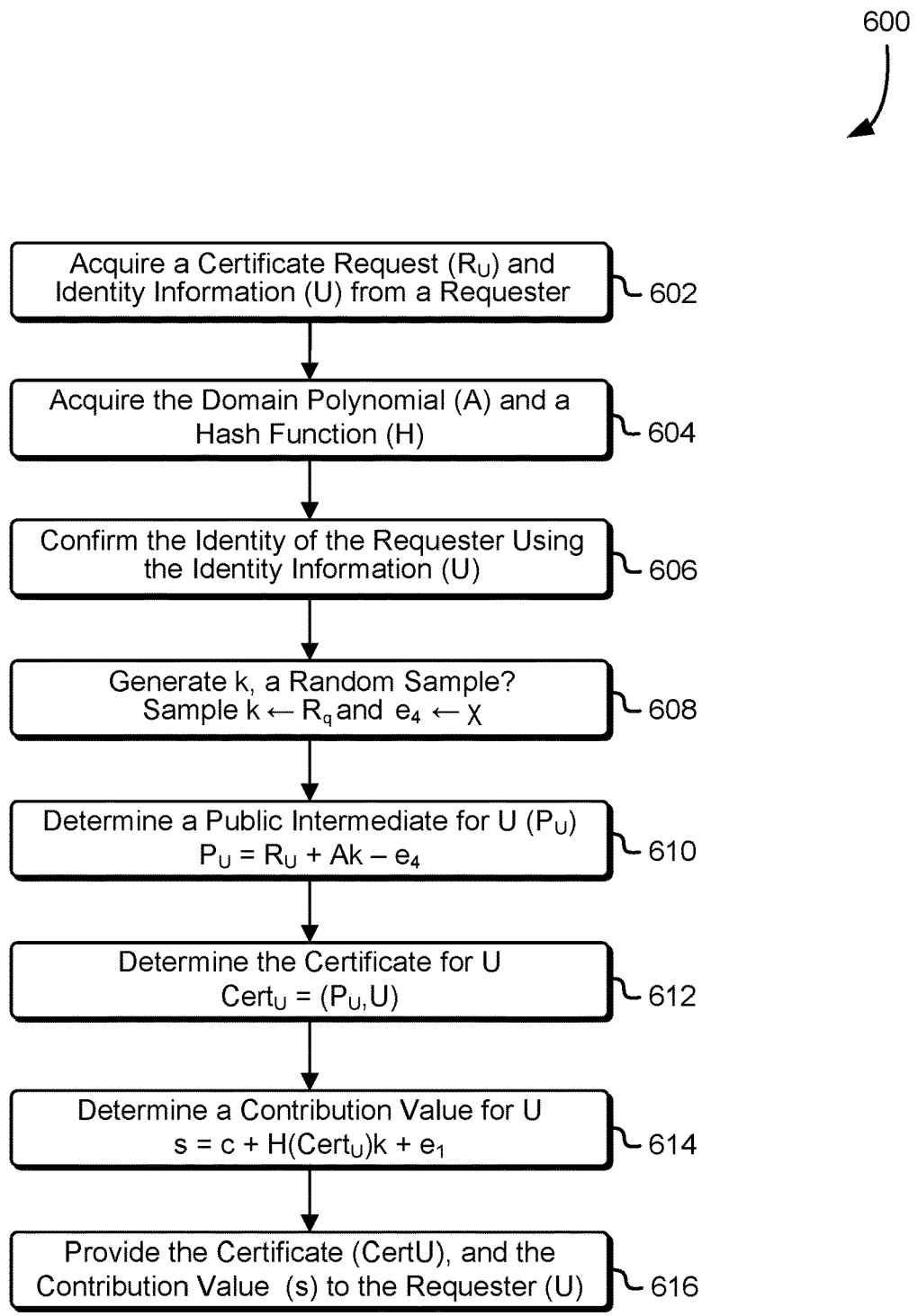
FIG. 6 shows an illustrative example of a process that, as a result of being performed by a certificate authority, generates an implicit certificate using Ring Learning With Errors.

FIG. 6 shows an illustrative example of a process that, as a result of being performed by a certificate authority, generates an implicit certificate using Ring Learning With Errors. A flowchart 600 illustrates a process that begins at block 602 with a certificate authority acquiring a certificate request $R_U$ and associated identifying information U from a requester. At block 604, the certificate authority acquires domain parameters including a domain polynomial A, a hash function H, and a ring of integers $R_q$. At block 606, the certificate authority confirms that the identity of the requester is in accordance with the identifying information U provided with the request $R_U$. In some implementations, the certificate authority confirms the identity of the requester by contacting an organization having authority over the requester. If the certificate authority is unable to confirm that the identity of the requester is in accordance with the identifying information U, the certificate authority returns an error and does not generate a certificate for the requester.

If the certificate authority is able to confirm that the identity of the requester is in accordance with the identifying information U, execution advances to block 608 where the certificate authority generates a random sample k from the ring of integers $R_q$, and determines an associated error term $e_4$. The certificate authority generates 610 a public intermediate value $P_U$ based on the request $R_U$, the random sample k, the domain polynomial A, and the error term $e_4$. At block 612, the certificate authority uses the public intermediate value $P_U$ and the identifying information U to generate a certificate for the requester $Cert_U$. At block 614, the certificate authority generates a contribution value s to be provided to the requester. The contribution value is determined using the certificate authority secret value c, a hash of the certificate $H(Cert_U)$, the random sample k, and the error value $e_1$ generated as a result of creating the CA's key pair. At block 616, the certificate authority returns the certificate $Cert_U$ and the contribution value s to the requester.

The process of generating an implicit certificate for the requester may be implemented using the following Python code:

```
#function that performs the CA's computations after reception of the request
def RLWEQV_CA_comp(a,R,e1,c,R_q,D):
    #CA computations
    k=R_q.random_element( )
    e3=D( )
    P=R_q(R+a*k-e3)
    H=R_q(DiscreteGaussianDistributionPolynomialSampler(ZZ['x'], 1024, 3.192)( ))
    #dummy value used as the hash of the certificate, it does not matter for correctness
    # that it is a dummy value but it has to remain consistent all along
    s=R_q(c+H*k+e1) #s and P are sent to both Alice and Bob
    return (H,P,s)
```

Figure 7:
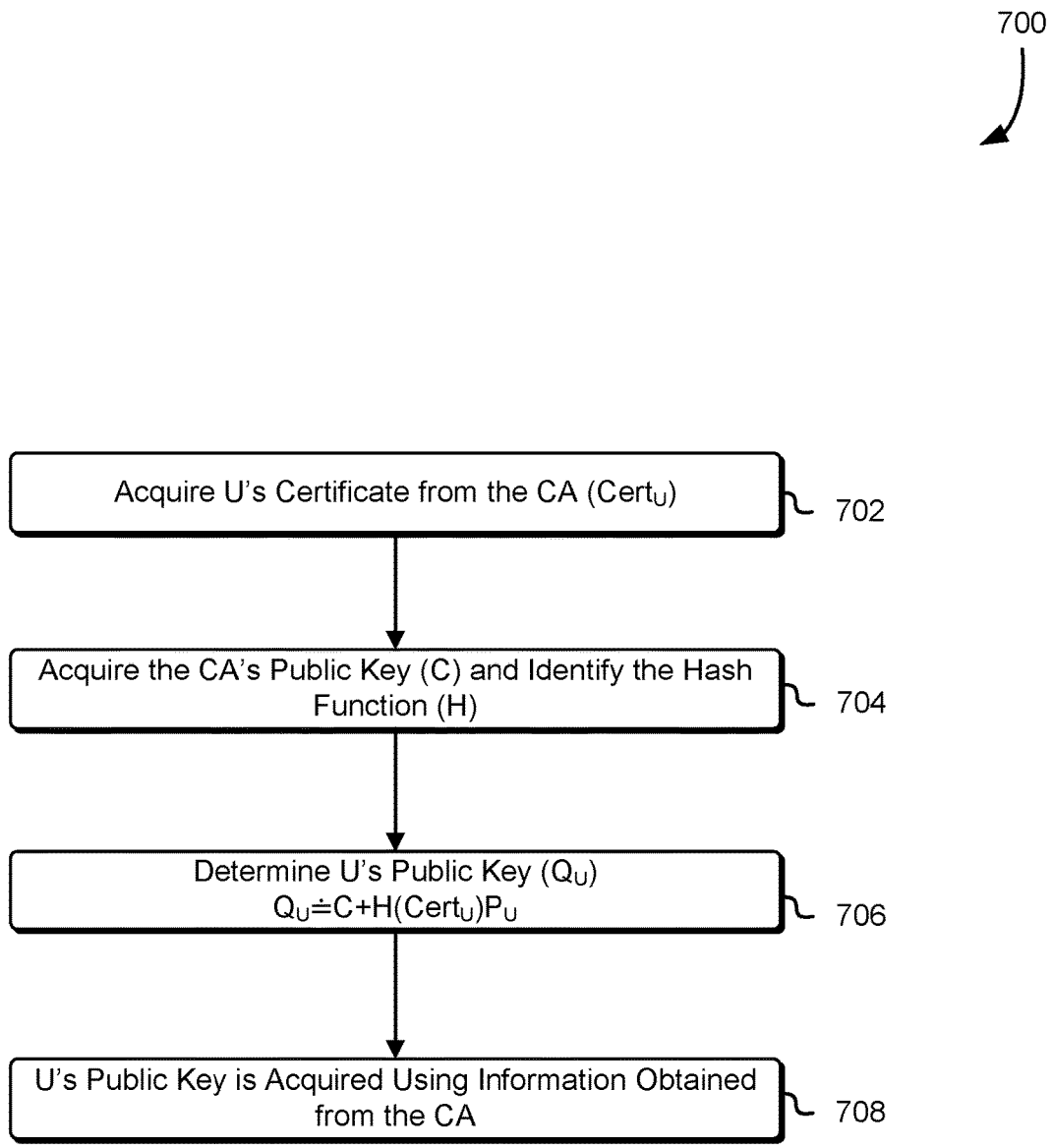
FIG. 7 shows an illustrative example of a process that, as a result of being performed by an entity, extracts a public key from an implicit certificate using Ring Learning With Errors.

FIG. 7 shows an illustrative example of a process that, as a result of being performed by an entity, extracts a public key from an implicit certificate using Ring Learning With Errors. A flowchart 700 illustrates a process that begins at block 702 with the entity acquiring a certificate $Cert_U$ of another entity U from a certificate authority. The entity acquires 704 various domain parameters from the certificate authority that allow the entity to generate a public key for the entity U. The domain parameters include the certificate authority's public key C, $P_U$ which was generated by the CA during certificate generation, and a hash function H. At block 706, the entity determines a public key $Q_U$ for the entity U using the public key of the certificate authority C, the hash of the certificate $H(Cert_U)$, and a value generated by the CA during generation of the certificate $P_U$ as follows:

$$Q_U \doteq C + H(Cert_U)P_U$$
$$\doteq A(c + H(Cert_U)(r+k) + e_1) + e_2 + H(Cert_U)(e_3 - e_4)$$
$$\doteq A(c + H(Cert_U)(r+k) + e_1) + E \text{ where}$$
$$E = e_2 + H(Cert_U)(e_3 - e_4)$$

At block 708, the entity has obtained the public key of the entity U using information obtained from the CA. The public key may be extracted using the following Python code:

```
#function that extracts a public key from an implicit certificate
def RLWEQV_key_extract(H,P,C,R_q):
    #Key computation
    Q=R_q(C+H*P) #certified public key
    return (Q)
```

Figure 8:
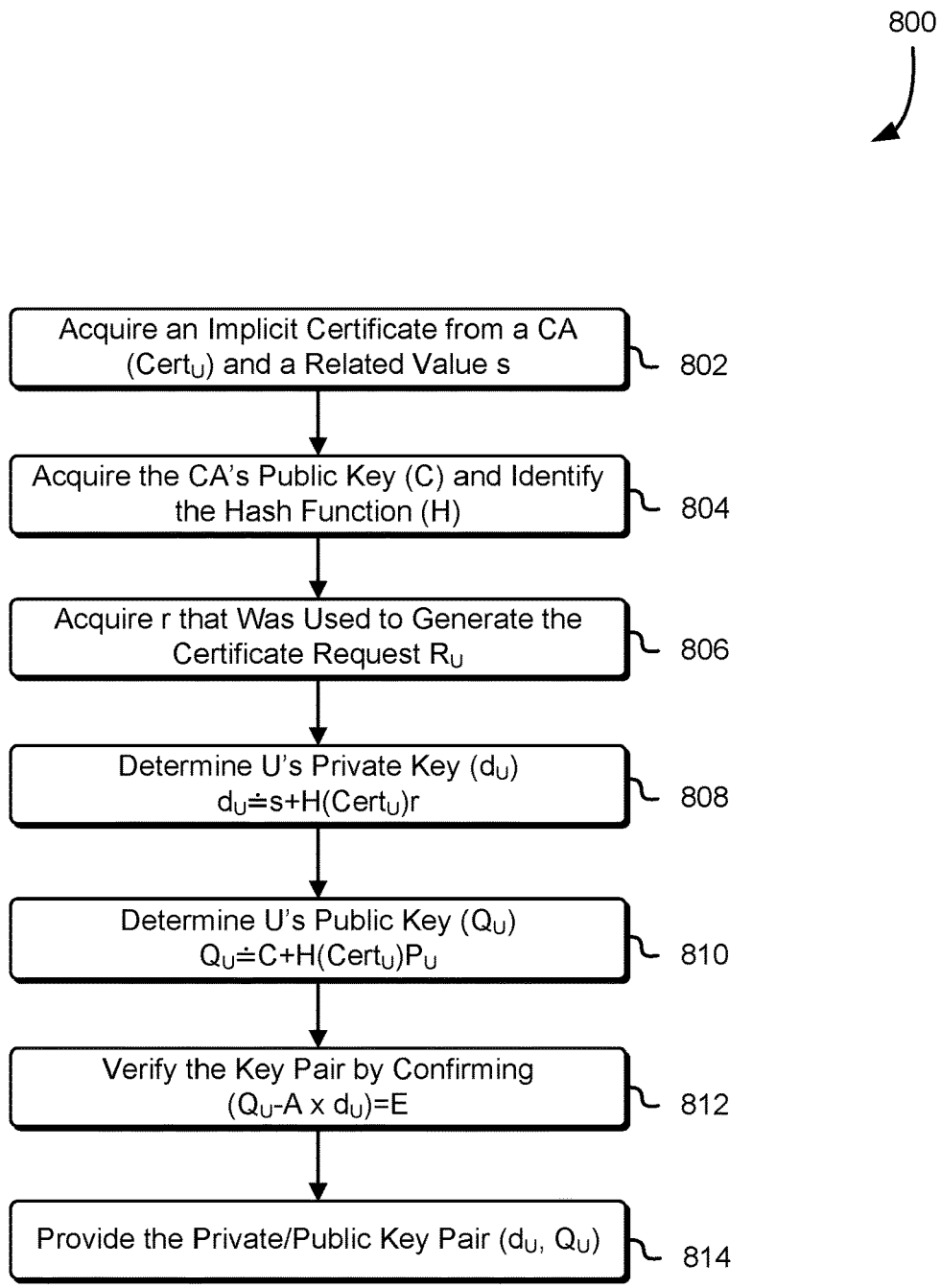
FIG. 8 shows an illustrative example of a process that, as a result of being performed by an entity, extracts a private/public key pair from an implicit certificate using Ring Learning With Errors.

FIG. 8 shows an illustrative example of a process that, as a result of being performed by an entity, extracts a private/public key pair from an implicit certificate using Ring Learning With Errors. A flowchart 800 illustrates a process that begins at block 802 with a requester U receiving an implicit certificate from a certificate authority along with a related value s. At block 804, the requester acquires the CA's public key C and identifies a hash function H. The requester acquires 806 a value r that is used to generate the request $R_U$. At block 808, the requester determines the private key $d_U$ using the acquired values by determining $d_U = s + H(Cert_U)r$.

$$d_U \doteq s + H(Cert_U)r$$

$$\doteq c + H(Cert_U)(r+k) + e_1$$

At block 810, the requester determines the public key $Q_U$ corresponding to the private key $d_U$ by determining $Q_U \doteq C + H(Cert_U)P_U$.

$$Q_U \doteq C + H(Cert_U)P_U$$

$$\doteq Ad_U + E$$

In some examples, after determining the public/private key pair, the requester verifies the integrity of the digital certificate by confirming that the key pair produces a small error. At block 812, the requester determines the error by determining $E = (Q_U - A \times d_U)$. If the requester determines that the error is greater than a threshold amount, the key pair and digital certificates are not valid. If the requester determines that the error is within a threshold amount, the key pair and certificate is confirmed as valid and execution advances to block 814. At block 814, the private/public key pair $(d_u, Q_U)$ is determined to be valid and can be used by the requester.

The following Python code may be used to implement the above procedure to extract the public/private key pair from the certificate:

```
#function that creates the final public key pair from the implicit certificate
def RLWEQV_key_comp(s,H,r,P,C,R_q):
```

```
#final keypairs computations
d=R_q(s+H*r) #certified private key
Q=R_q(C+H*P) #certified public key
return (d,Q)
```

Figure 9:
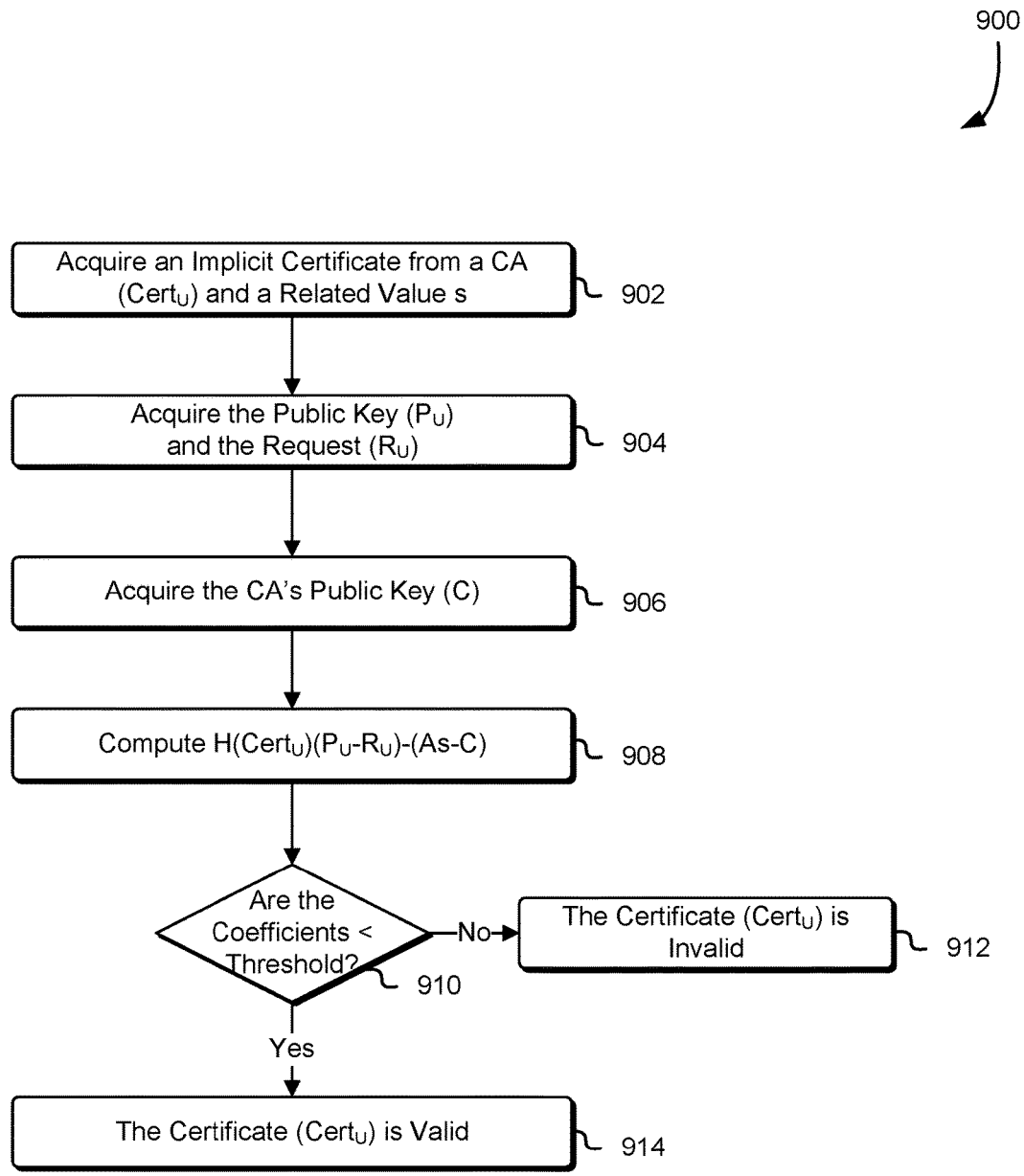
FIG. 9 shows an illustrative example of a process that, as a result of being performed by an entity, verifies an implicit certificate using an explicit signature.

FIG. 9 shows an illustrative example of a process that, as a result of being performed by an entity, verifies an implicit certificate using an explicit signature. A flowchart 900 illustrates a process that begins at block 902 with an entity receiving an implicit certificate to be verified. The entity acquires the certificate $Cert_U$ and the related value s from a certificate authority. At block 904, the entity acquires a public value $P_U$ and the request $R_U$. At block 906 the entity acquires the certificate authority's public key C from the CA. At block 908, the entity checks the validity of the certificate by computing $H(Cert_U)(P_U-R_U)-(As-C)$.

At decision block 910, the entity determines whether the resulting coefficients are less than the threshold value. If the resulting coefficients are not less than the threshold value, execution advances to block 912 and the entity determines that the certificate $Cert_U$ is invalid. If the resulting coefficients are less than the threshold value, execution advances to block 914 and the entity determines that the certificate $Cert_U$ is valid.

The implementation of the implicit certificate scheme illustrated in FIG. 4 through FIG. 8 may be verified using the following Python code:

```
# function that tests that the generated key pair is valid by checking that the error
# coefficients are small as expected. This function generates keys and tests them
# numberOfTests times and outputs the maximal number of coefficients that were
# not valid among all the tests
def RLWEQV(numberOfTests):
    #to test that final error terms are small as expected
    l=[ ]
    i=0
    while i< numberOfTests:
        (d,Q,R_q,a,D)=RLWEQV_keyGen( )
        i+=1
        # For the test
        val1=1073741827 #q/4
        val2=3221225483 #3q/4
        error=R_q((Q-a*d)) #error term of the obtained public key
        countR=0          #count number of coefficients of the error that are not small as
                          # expected for j in vector(error):
        if j>val1 and j<val2:
            countR+=1
        l.append(countR)
    print numerical_approx(max(l))   # prints the maximum number of error coefficients
                                     # that are not small as expected over numberOfTests
                                     # tests, the result is zero on success
```

Figure 10:
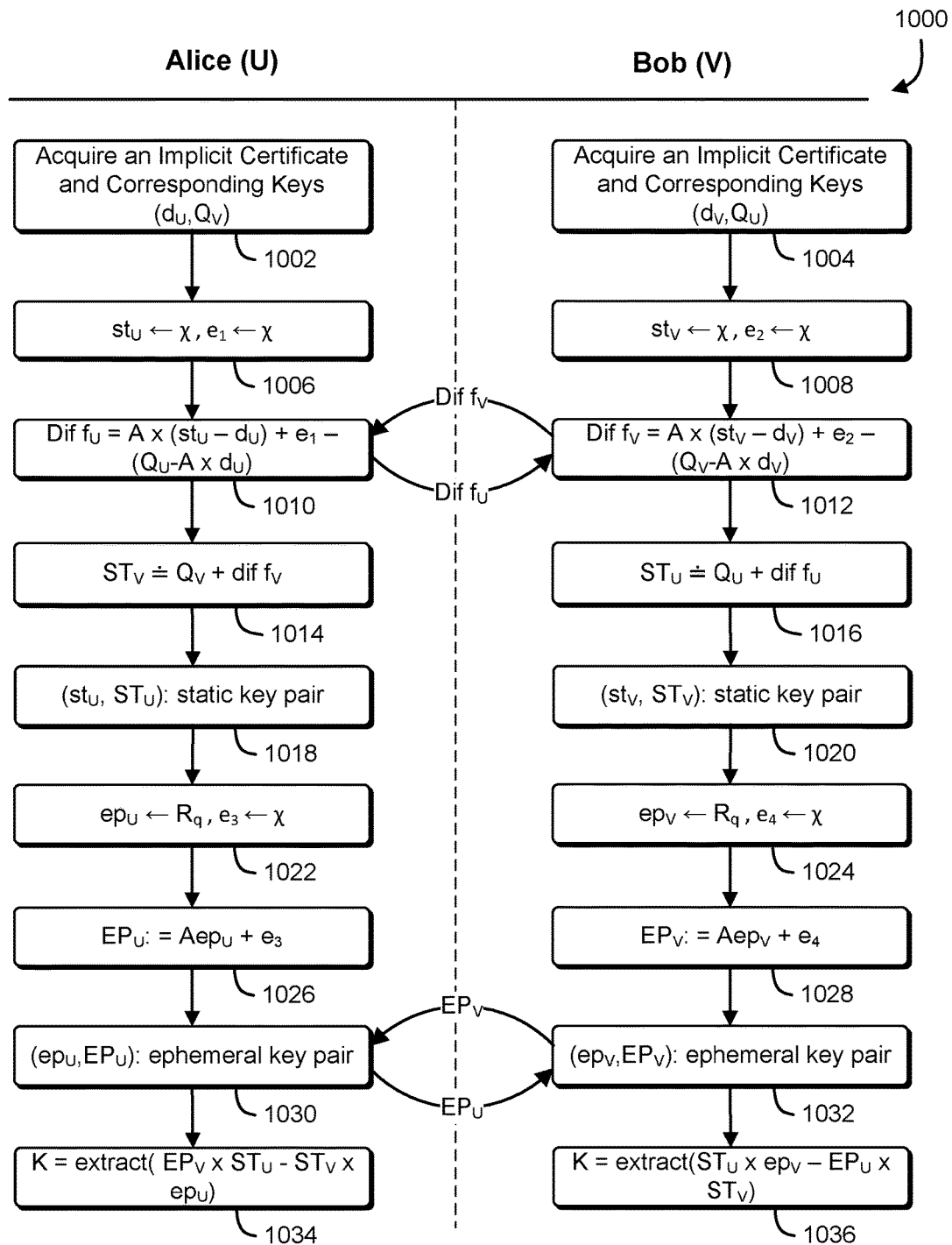
FIG. 10 shows an illustrative example of a process that, as a result of being performed by two entities Alice (U) and Bob (V), performs a key exchange based on RLWE.

At block 1018, Alice has a static key pair (stU, STU). At block 1020, Bob has a static key pair (stV, STV). FIG. 10 shows an illustrative example of a process that, as a result of being performed by two entities Alice (U) and Bob (V), performs a key exchange based on RLWE. A flowchart 1000 illustrates a process that establishes a pair of ephemeral keys for use in establishing a communication channel between U and V. In various examples, both participants U and V acquire a static public key pair via an implicit certificate as described above. At block 1002, U acquires an implicit certificate and corresponding keys $d_U$ and $Q_V$ where $d_U$ is U's private key and $Q_V$ is V's public key. At block 1004, V acquires an implicit certificate and corresponding keys $d_V$ and $Q_U$ where $d_V$ is V's private key and $Q_U$ is U's public key. The entities U and B switch the secret and, as a result, the secrets are small enough that the key exchange is reliable. At block 1006, U determines a new private key $st_U$. At block 1008, V determines a new private key $st_V$. At blocks 1010 and 1012, U and V each determine a Dif factor ($f_U$ and $f_V$) based on their respective private keys ($d_U$ and $d_V$) and private key amounts ($st_U$ and $st_V$). At blocks 1014 and 1016, U and V each determine a new public key $ST_U$ and $ST_V$. $ST_V$ is determined by:

$$ST_V \doteq Q_V + dif f_V$$

$$\doteq A \times st_V + e_2$$

$ST_V$ is determined by:

$$ST_U \doteq Q_U + dif f_U$$

$$\doteq A \times st_U + e_1$$

Using the Dif factors ($f_U$ and $f_V$) previously exchanged, each entity creates an ephemeral key pair and exchanges the public parts. At block 1022 and 1024, U and V each determine a private ephemeral key ($ep_U$ and $ep_V$). At block 1026 and 1028, U and V each determine a corresponding public ephemeral key ($EP_U$ and $EP_V$). At block 1030, U provides its public ephemeral key $EP_U$ to V, and at block 1032, V provides its public ephemeral key $EP_V$ to U. At blocks 1034 and 1036, the final shared secret key K is determined by both U and V as a combination of both the static and ephemeral key pairs. The following python code provides an implementation of the key exchange scheme.

```
#function that creates the static keys from the keys containing the implicit certificate.
def KeySwitch(d,Q,R_q,a,D):
        st=D( )                         #Alice final private static key e=D( )
        diff=R_q(a*(st-d)+e-(Q-a*d))    #difference between the old and new static
        secret ST=R_q(Q+diff)           #static public key
        return (st,ST)
#function that generates a RLWE public key pair
def RLWEQV_ephemeral(a,R_q,D):
        #requests computations
        r=D( )( )                       #secret
        e2=D( )
        R=R_q(a*r+e2)                   #request sent to the CA
        return (R,r)
#function that creates one participant's final symmetric key from his secret static and
ephemeral keys and the other participant's public static and ephemeral keys.
def RLWEQV_Key(st,ST,ep,EP,R_q):
        k=R_q(ST*ep-EP*st)  #final polynomial from which the shared secret is
        extracted val1=1073741827       #q/4
        val2=3221225483     #3q/4
        lk=[ ]              #list with final shared secret bits
        for z in vector(k): #extraction of final shared bits from coefs of k
                if z>val1 and z<=val2:
                        lk.append(0)
                else:
                        lk.append(1)
        return (lk)
#function that uses the above functions to create the shared symmetric key and tests if the
# final key is the same for both participants. This function creates new ephemeral keys
# and new symmetric keys numberOfTests times and outputs the number of times where
# both participants did not end up with the same symmetric key.
def KeyExchange(numberOfTests): test=[ ]
(da,Qa,db,Qb,R_q,a,D)=RLWEQV_keyGen_double( )
(sta,STa)=KeySwitch(da,Qa,R_q,a,D)
(stb,STb)=KeySwitch(db,Qb,R_q,a,D)
i=0
while i<numberOfTests:
        #creation of ephemeral key pairs (EPa,epa)=RLWEQV_ephemeral(a,R_q,D)
        (EPb,epb)=RLWEQV_ephemeral(a,R_q,D)
        #Final symmetric key creation (lka)=RLWEQV_Key(sta,STb,epa,EPb,R_q)
        (lkb)=RLWEQV_Key(stb,STa,epb,EPa,R_q)
        v=0
        #Now lka and lkb should be identical and that is the shared secret key
        #test to check that both lists are indeed identical
        j=0
        b=True
        while j<len(lka):
                if lka[j]!=lkb[j]:
                        b=False
                j+=1
        test.append(b)
        i+=1
v=0
count=0
while v<len(test):
        if test[v]==False:
                count+=1
        v+=1
        print count         #shows the number of times the final secret was not the same for
                            #Alice and Bob when tested numberOfTests times with the same
                            #static key pair
```

Figure 11:
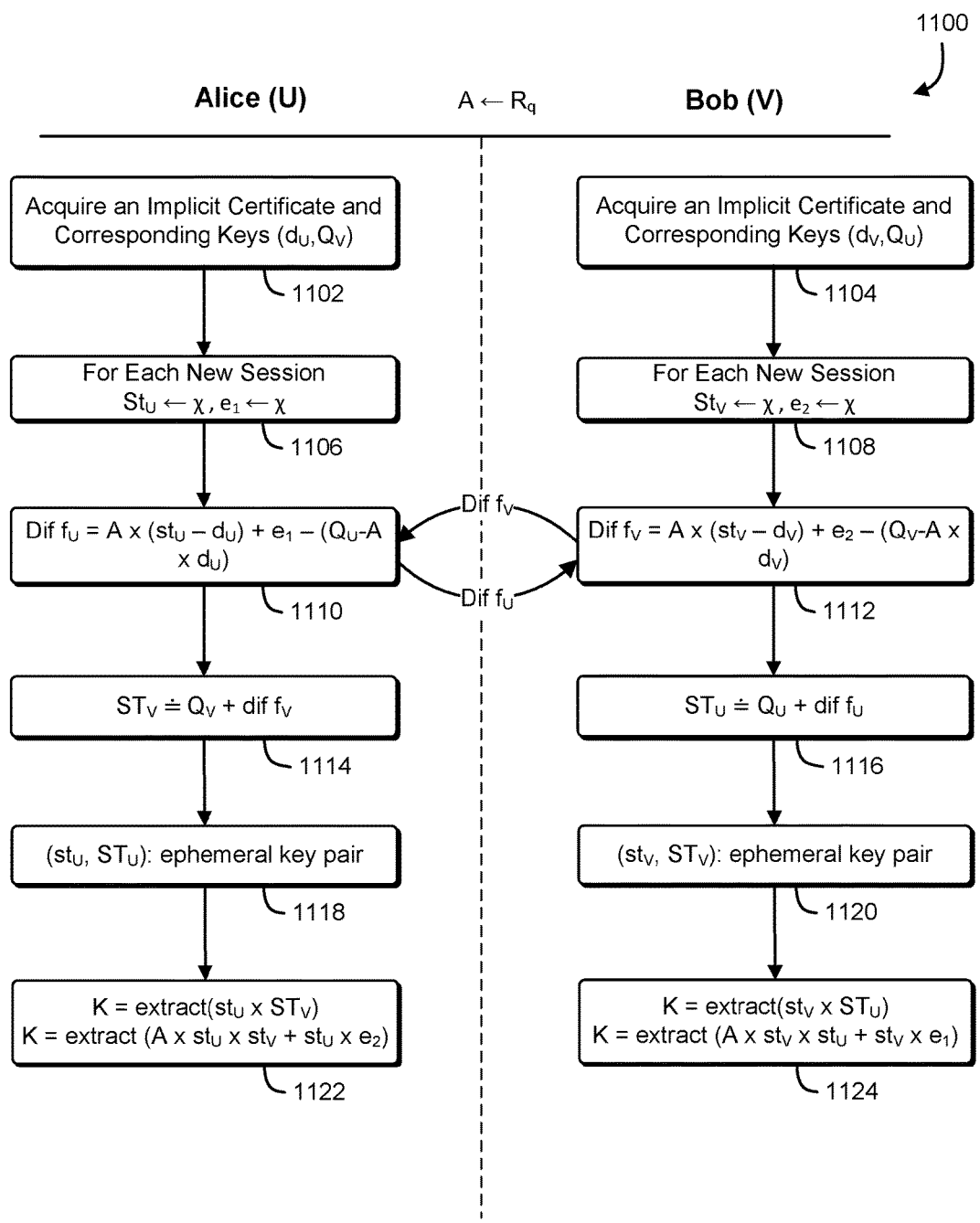
FIG. 11 shows an illustrative example of a process that, as a result of being performed by two entities Alice (U) and Bob (V), performs a key exchange.

FIG. 11 shows an illustrative example of a process that, as a result of being performed by two entities Alice (U) and Bob (V), performs a key exchange. A swim diagram 1100 illustrates a process that begins at blocks 1102 and 1104 with entities U and V acquiring an implicit certificate and corresponding key pairs. U is in possession of U's private key $d_U$ and Q's public key $Q_V$. The key exchange scheme shown and described in FIG. 10 uses a key switch and exchanges a message to obtain the static keys. The example in FIG. 11 illustrates a key exchange scheme that uses fewer computations while remaining correct. The (di, Qi) key pairs established with the help of the CA are the static keys, and the (sti, STi) keys are the ephemeral key pairs that are computed new from the static pair for every new session. At block 1106, U determines a new private key $st_U$. At block 1108, V determines a new private key sty. At blocks 1110 and 1112, U and V each determine a Dif factor ($f_U$ and $f_V$) based on their respective private keys ($d_U$ and $d_V$) and private key amounts ($st_U$ and $st_V$). At blocks 1114 and 1116, U and V each determine a new public key $ST_U$ and $ST_V$. $ST_V$ is determined by:

$$ST_V \doteq Q_V + dif f_V$$

$$\doteq A \times st_V + e_2$$

$ST_V$ is determined by:

$$ST_U \doteq Q_U + dif f_U$$

$$\doteq A \times st_U + e_1$$

At blocks 1118 and 1120, U and V have each established an ephemeral key pair $(st_U, ST_U)$ and $(st_V, ST_V)$. At blocks 1122 and 1124, the shared symmetric key K is determined by U and V using an extract function used above in FIG. 10 on an input that combines the static and ephemeral keys. An implementation of the process illustrated in FIG. 11 is shown in the Python code below:

```
#This function creates the final shared key from the ephemeral keys
def RLWEQV_NewKey(st,ST,R_q):
    k=R_q(st*ST)          #final polynomial from which the shared secret is extracted
    val1=1073741827       #q/4
    val2=3221225483       #3q/4
    lk=[ ]                #list with final shared secret bits
    for z in vector(k): #extraction of final shared bits from coefs of k
        if z>val1 and z<=val2:
            lk.append(0)
        else:
            lk.append(1)
    return (lk)
```

This function uses the previous function KeySwitch to generate the ephemeral keys from the static keys and uses the previous function to establish the shared symmetric key. It generates ephemeral keys and a shared symmetric key numberOfTests times and tests that the final output key is the same for both participants.

```
def NewKeyExchange(numberOfTests):
    test=[ ]
    (da,Qa,db,Qb,R_q,a,D)=RLWEQV_keyGen_double( ) i=0
    while i<numberOfTests:
        (sta,STa)=KeySwitch(da,Qa,R_q,a,D)
        (stb,STb)=KeySwitch(db,Qb,R_q,a,D)
        #Final symmetric key creation
        (lka)=RLWEQV_NewKey(sta,STb,R_q)
        (lkb)=RLWEQV_NewKey(stb,STa,R_q)
        #Now lka and lkb should be identical and that is the shared secret key
        #test to check that both lists are indeed identical
        j=0
        b=True
        while j<len(lka):
            if lka[j]!=lkb[j]:
                b=False
            j+=1
        test.append(b)
        i+=1
    v=0
    count=0
    while v<len(test):
        if test[v]==False:
            count+=1
        v+=1
    print count #shows the number of times the final secret was not the same for Alice
    # and Bob when tested numberOfTests times with the same static key pair and new
    #ephemeral keys each time
```

In various examples such as those shown in FIG. 10 and FIG. 11, a shared key may be used establish an encrypted communication session between parties having access to the shared key. Messages are encrypted by one party using the shared key, transmitted to the other party, and decrypted using a matching shared key which is known to the other party.

Figure 12:
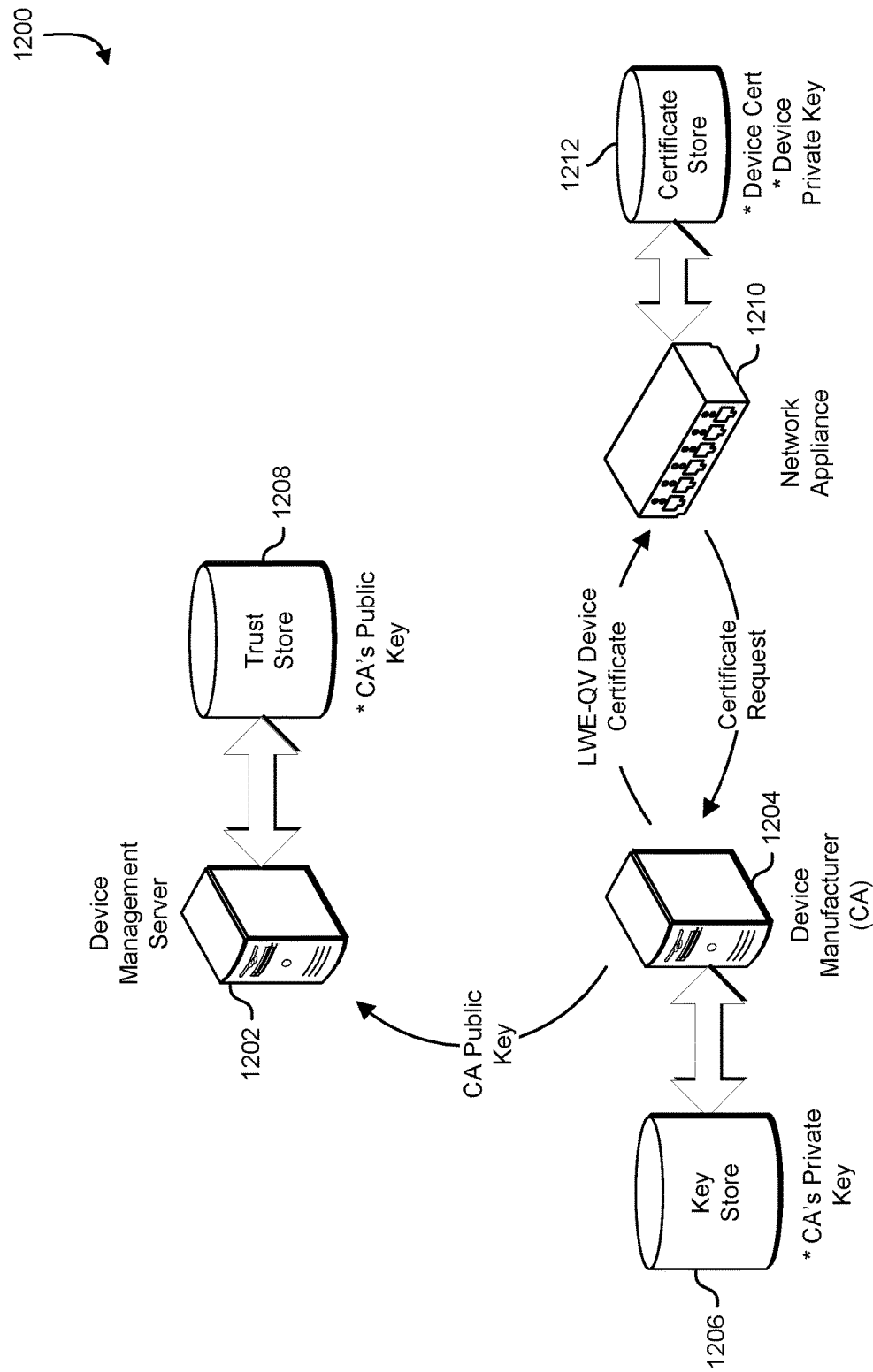
FIG. 12 shows an illustrative example of a system where implicit certificates are issued to devices by a device manufacturer, and a device management service is provided with a public key that allows the certificates to be used.

FIG. 12 shows an illustrative example of a system where implicit certificates are issued to devices by a device manufacturer, and a device management service is provided with a public key that allows the certificates to be used. A system diagram 1200 includes a device management server 1202 that hosts a device management service. The device management server 1202 communicates with devices manufactured by one or more device manufacturers. In some examples, the device management server 1202 is connected to a computer network such as the Internet, and communicates with various Internet-connected devices to perform device management functions. The Internet-connected devices may include sensor devices, system-control devices, or computing devices. In some implementations, the Internet-connected devices may include home appliances, home automation peripherals, or environment-monitoring devices, and the device management server 1202 collects and/or stores data from the Internet-connected devices. In another implementation, the Internet-connected devices may include device controllers, environmental controls, or other open devices, and the device management server 1202 provides commands to the Internet-connected devices.

A device manufacturer computer system 1204 acts as a certificate authority, and maintains a key store 1206. In some examples, the key store is maintained on a storage device on the device manufacturer computer system 1204. In another example, the key store is maintained on a storage device separate from the device manufacturer computer system 1204. In various implementations, the key store is maintained as a linked list, binary tree, ordered array, or relational database structure. The key store may be encrypted using a cryptographic key that is accessible to the device manufacturer computer system 1204. The key store 1206 may be used by the device manufacturer computer system 1204 to retain cryptographic keys that may be used to manage Internet-connected devices. In various examples, the key store 1206 retains one or more of public and private keys associated with the certificate authority, public and private keys associated with Internet-connected devices, and public and private keys associated with the device management server 1202.

The device management server 1202 maintains a trust store 1208. The trust store 1208 maintains a set of public keys that are associated with entities that are trusted by the device management server 1202. In some examples, the public key of the device manufacturer computer system 1204 is stored in the trust store 1208. The trust store 1208 may also be used to retain public keys associated with other certificate authorities.

A device manufacturer manages the initialization of a network appliance 1210 such as a network-connected sensor, network-connected control, network-connected home appliance, or other device. The network appliance 1210 maintains a certificate store 1212. The certificate store 1212 retains a digital certificate associated with the network appliance 1210 and a private key associated with the network appliance 1210.

When the manufacturer creates the network appliance 1210, the manufacturer may facilitate the initialization of the network appliance 1210 by either working with the network appliance 1210 to generate a digital certificate and cryptographic key pair, or generating a digital certificate on the network appliance's behalf. In some implementations, the device manufacturer computer system 1204 generates a digital certificate for the network appliance 1210 and provides the digital certificate to the network appliance 1210 at manufacturing time. The network appliance 1210 stores the digital certificate on the certificate store 1212. In another implementation, the device manufacturer computer system 1204 causes the network appliance 1210 to generate a digital certificate and the cryptographic key pair. The network appliance 1210 sends the unsigned certificate to the device manufacturer computer system 1204 and the device manufacturer computer system 1204 signs the digital certificate with the private key of the certificate authority which is retained in the key store 1206. The network appliance 1210 retains the appliances private key and the digital certificate signed by the certificate authority in the certificate store 1212. The device manufacturer computer system 1204 provides the device management server 1202 with the public key of the certificate authority which enables the device management server 1202 to verify the authenticity of certificates provided by the network appliances.

Figure 13:
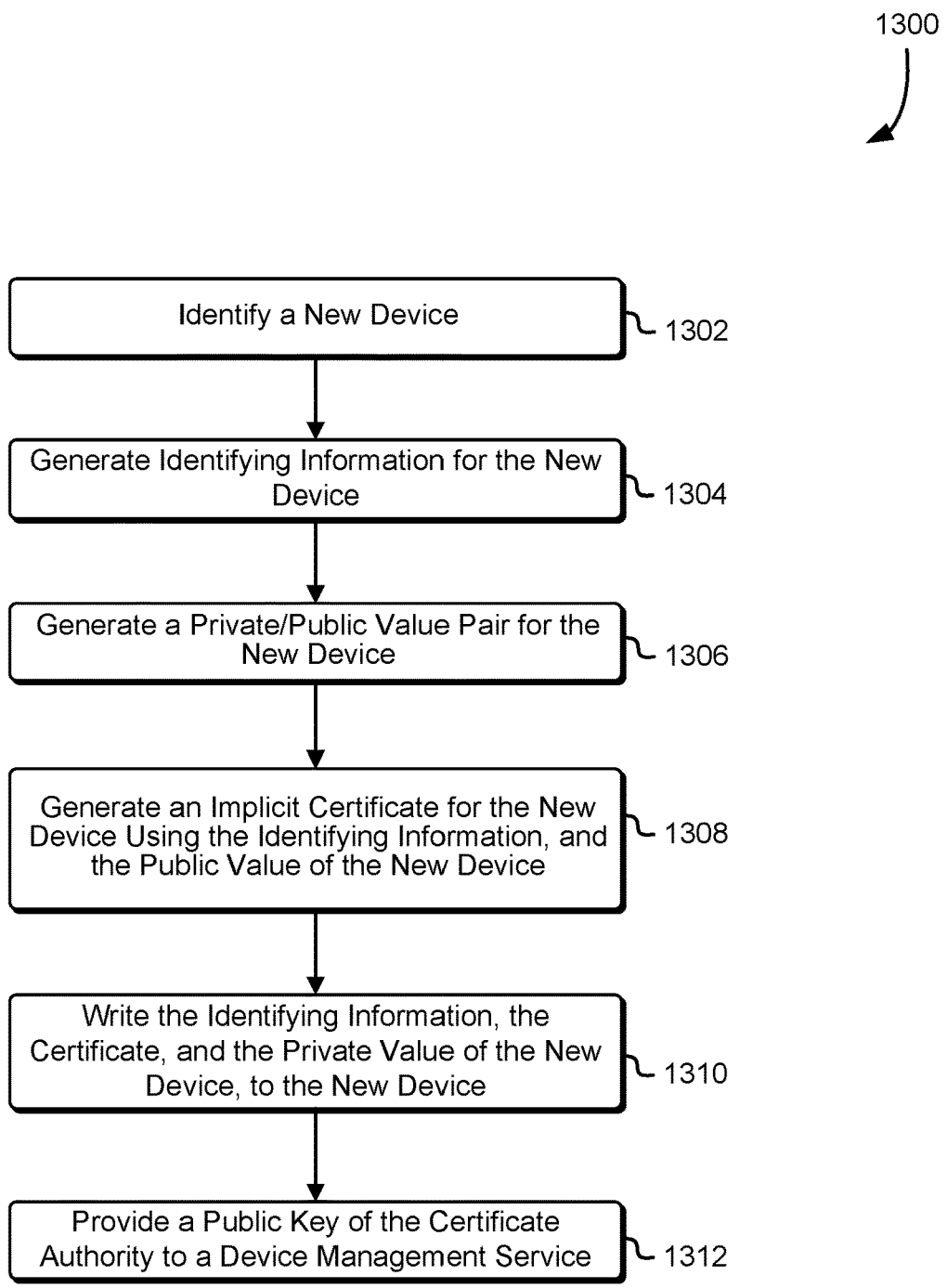
FIG. 13 shows an illustrative example of a process that, as a result of being performed by a device manufacturer, issues an implicit certificate to a device.

FIG. 13 shows an illustrative example of a process that, as a result of being performed by a device manufacturer, issues an implicit certificate to a device. A flowchart 1300 illustrates a process that begins at block 1302 with a device manufacturer computer system identifying a new device. In some examples, the new device is a device built by the device manufacturer. In another example, the device is a new device being sold by a merchant to an end-user. At block 1304, the device manufacturer computer system generates identifying information for the new device. The identifying information may include one or more of a name, a network address, an identifier, a serial number, or other information specific to the new device. At block 1306, the device manufacturer computer system generates new private and public values for the new device.

The device management computer system acts as a certificate authority and generates an implicit certificate for the new device in accordance with one of the certificate-generation methods described above. At block 1308, the manufacturer computer system uses the public value of the new device and the identifying information of the new device to generate an implicit certificate for the new device. The implicit certificate may be used to establish an authenticated communication channel with a device management service. In some examples, the implicit certificate may be used to establish a communication channel with any other entity where the identity of the new device is authenticated. In another example, the implicit certificate may be used to establish a communication channel with the specific entity where the identities of both the specific entity and the new device are authenticated.

At block 1310, the device manufacturer computer system provides the identifying information, the certificate, and the private value of the new device, to the new device. In some examples, the information is provided to the device via a communication channel established during the manufacturing process. In another example, the information is provided to the device by writing the information to a memory device, and installing the memory device on the new device. At block 1312, the device manufacturer computer system provides a public key of the certificate authority to a device management service. In some examples, the device manufacturer computer system publishes the public key of the certificate authority so that various device management services may establish authenticated communication channels using the implicit certificates provided to the devices. The device management service may be a service operated by the device manufacturer or another entity.

Figure 14:
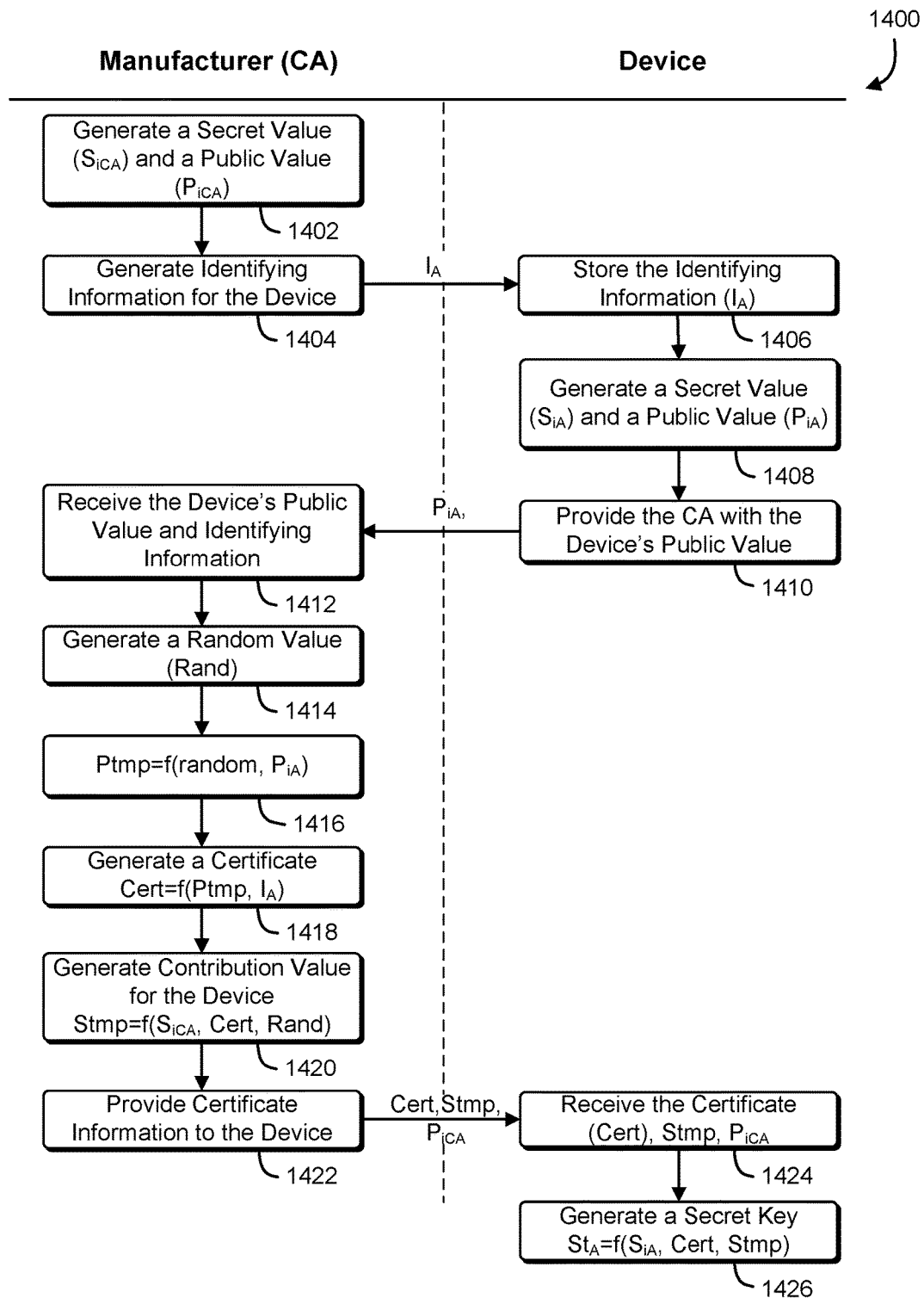
FIG. 14 shows an illustrative example of a process that, as a result of being performed by a device manufacturer and a device, generates an implicit certificate for use by the device.

FIG. 14 shows an illustrative example of a process that, as a result of being performed by a device manufacturer and a device, generates an implicit certificate for use by the device. The process illustrates a method of providing a device with an implicit certificate bound to RLWE public keys which are usable to establish communication between the device and various other entities such as web services. In various implementations, the device may be a computer system, service, mobile device, cellular device, network-connected sensor, network appliance, wearable device, or an internet-of-things ("IOT") entity. A swim diagram 1400 illustrates a process that begins at block 1402 with initialization of values by the device manufacturer computer system, which also acts as a certificate authority. If a secret value and a public value are not already available for the certificate authority, the device manufacturer computer system generates a secret value and a public value for the certificate authority that will be used to generate an implicit certificate for the device. At block 1404, the device manufacturer computer system generates identifying information for the device. The identifying information may include a network address, a device name, a device serial number, or other identifying information. The manufacturer computer system sends the identifying information to the device.

The device receives the identifying information at block 1406. At block 1406, the device stores the identifying information to a memory accessible to the device. At block 1408, the device generates a secret value $S_{iA}$ and a public value $P_{iA}$. At block 1402, the manufacturer generates a secret value $Si_{CA}$ and a public value $Pi_{CA}$. At block 1410, the device provides the manufacturer with the device's public value $P_{iA}$ and information that identifies the device $I_A$. The information that identifies the device may be a name, an identifier, an address, a domain name, or other information associated with the device. At block 1410, the device provides the public value of the device to the manufacturer computer system. At block 1412, the manufacturer computer system receives the device's public value, and in some examples, additional identifying information from the device.

At block 1414, the manufacturer computer system begins the process of generating a certificate that will allow the device to communicate with other entities. At block 1414, the manufacturer generates a random value (Rand) to be used in the certificate generation process. At block 1416, the manufacturer generates a temporary value (Ptmp) that is a function of the random value (Rand) and the device's identifying information $I_A$. At block 1418, the manufacturer generates the certificate (Cert) using the temporary value (Ptmp) and the device's identifying information $I_A$. The manufacturer generates 1420 a specific contribution value (Stmp) that is a function of the manufacturer's secret value $S_{iCA}$, the certificate (Cert), and the random number (Rand). The certificate, the specific contribution value (Stmp), and the random number (Rand) are provided 1422 to the device.

At block 1424, the device receives the certificate (Cert), the secret value (Stmp), and the public value of the manufacturer $P_{iCA}$, which allows the device to generate a secret and public key pair. At block 1426, the device generates the device's secret key ($St_A$) from the device's secret value ($S_{iA}$), the certificate (Cert), and the specific contribution value (Stmp). Other entities may generate the device's public key by acquiring the Certificate (Cert), the specific contribution value (Stmp), and the public value $P_{iCA}$ from the manufacturer, and then generating the device's public key ($Pst_A$) from the public value of the manufacturer ($S_{iCA}$) and the certificate (Cert).

Figure 15:
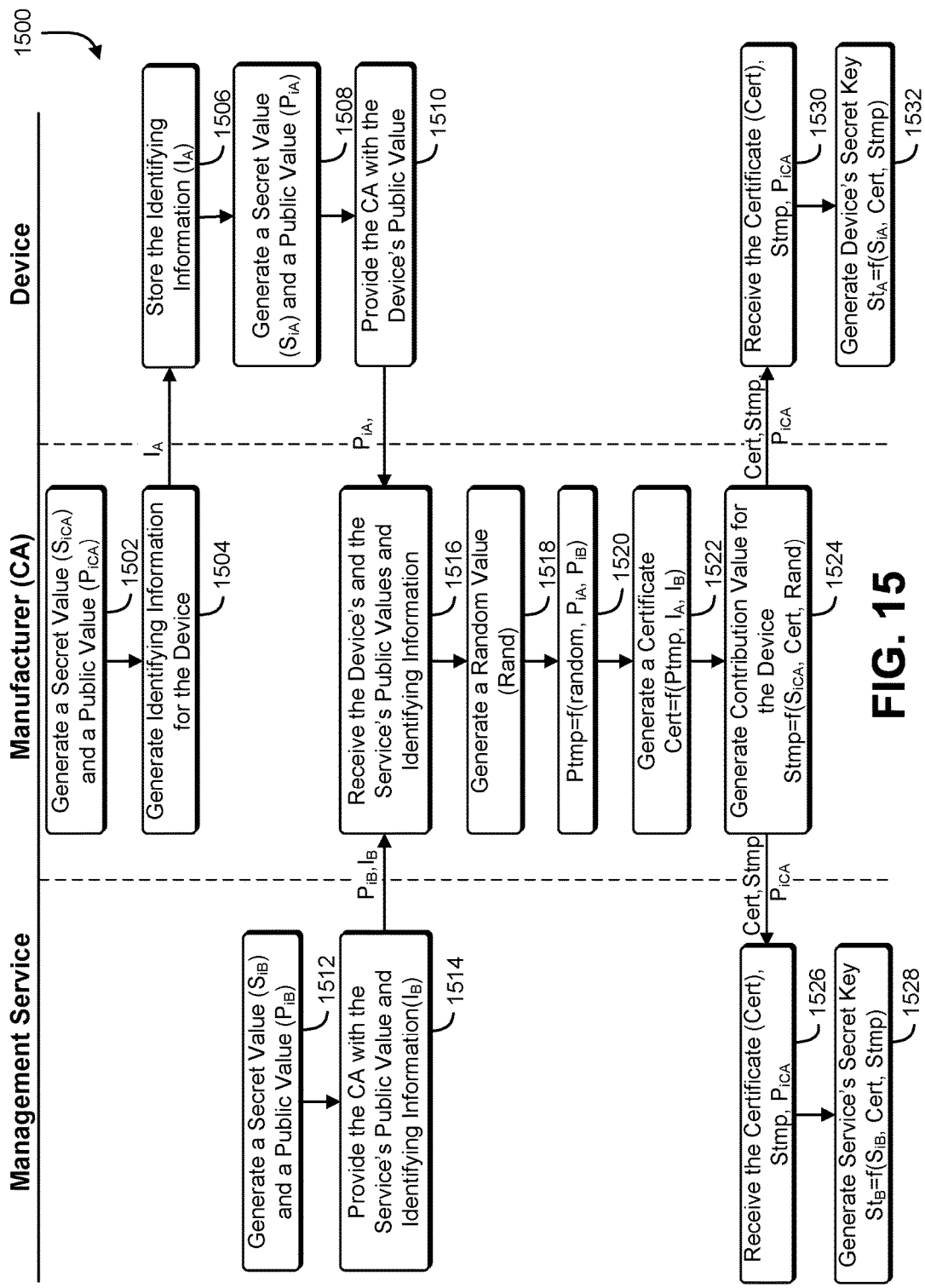
FIG. 15 shows an illustrative example of a process that, as a result of being performed by a device management service, a device manufacturer, and a device, generates an implicit certificate for use in establishing an authenticated communication between the device and the device management service.

FIG. 15 shows an illustrative example of a process that, as a result of being performed by a device management service, a device manufacturer, and a device, generates an implicit certificate for use in establishing an authenticated communication between the device and the device management service. The process illustrates methods of providing implicit certificates bound to RLWE public keys which are usable to establish communication between two entities, such as a device management service and a device.

A swim diagram 1500 illustrates a process that begins with initialization of values by the two parties to the communication and a certificate authority. At block 1502, the manufacturer computer system which is acting as the certificate authority generates a secret value $Si_{CA}$ (c) and a public value $Pi_{CA}$(C).

$$CA(c, C=Ac+Ae_1+e_2)$$

At block 1504, the manufacturer computer system generates identifying information for the device, and the identifying information ($I_A$) is provided to the device. The device receives 1506 the identifying information ($I_A$) and stores the identifying information in a memory accessible to the device. At block 1508 the device generates a secret value $S_{iA}$ (r) and a public value $P_{iA}(R_U)$.

$$r \leftarrow Rq, e_4 \leftarrow \chi$$

$$R_U := Ar + e_3$$

At block 1510, the device provides the public value $P_{iA}$ to the manufacturer computer system.

At block 1512, the management service generates a secret value $S_{iB}$ (t) and a public value $P_{iB}$.

$$t \leftarrow Rq, e_4 \leftarrow \chi$$

$$R_V := At + e_4$$

At block 1514, the management service provides the manufacturer computer system with the management services public value $P_{iB}$ and information that identifies the management service $I_B$.

At block 1516, the manufacturer computer system receives information from the device and the management service, and verifies the identifying information of each entity. In some examples, the manufacturer computer system verifies the identifying information of the management service with another certificate authority. If the other certificate authority is unable to verify the identifying information provided by the management service, the manufacturer computer system will not generate and issue a certificate to either party. If the manufacturer computer system is able to verify the identifying information, the process advances to block 1518 and the manufacturer computer system begins the process of generating a certificate that will allow the device and the management service to communicate with each other over an authenticated connection. At block 1518, the manufacturer computer system generates a random value (Rand or k) to be used in the certificate generation process.

$$k \leftarrow R_q$$

At block 1520, the manufacturer computer system generates a temporary value (Ptmp) that is a function of the random value (Rand), the device's identifying information $I_A$, and the management service's identifying information $I_B$.

$$P = R_U + R_V + Ak - e_5$$

At block 1522, the manufacturer computer system generates the certificate (Cert) using the temporary value (Ptmp), the identifying information $I_A$, and the identifying information $I_B$.

$$Cert := Encode(P, U, V)$$

The manufacturer computer system generates 1524 a specific contribution value (Stmp) that is a function of the manufacturer computer system's secret value $S_{iCA}$, the certificate (Cert), and the random number (Rand).

$$Stmp := c + H(Cert)k + e_1$$

The certificate, the specific contribution value (Stmp), and the random number (Rand), are provided to both the device and the management service.

At block 1530, the device receives the certificate (Cert), the secret value (Stmp), and the public value of the certificate authority $P_{iCA}$, which allows the device to generate a secret and public key pair. At block 1532, the device generates a secret key ($St_A$) from the device's secret value ($S_{iA}$), the certificate (Cert), and the specific contribution value (Stmp).

$$d_U := s + H(Cert)r$$

In various implementations, the device may generate the management service's public key ($Pst_B$) from the public value of the manufacturer computer system ($S_{iCA}$), the certificate (Cert), and the devices public value ($P_{iA}$).

$$Q_V := C + H(Cert)P - R_U$$

At block 1526, the management service receives the certificate (Cert), the secret value (Stmp), and the public value of the manufacturer computing device $P_{iCA}$, which allows the management service to generate a secret and public key pair. At block 1528, the management service generates a secret key ($St_B$) from the management service's secret value ($S_{iB}$), the certificate (Cert), and the specific contribution value (Stmp).

$$d_V := s + H(\text{Cert})t$$

the management service may generate the device's public key ($Pst_A$) from the public value of the manufacturer computer system ($S_{iCA}$), the certificate (Cert), and the management service's public value ($P_{iB}$).

$$Q_U := C + H(\text{Cert})P - R_V$$

The resulting implicit certificate allows the management service on the device to establish an authenticated communication session with each other.

Figure 16:
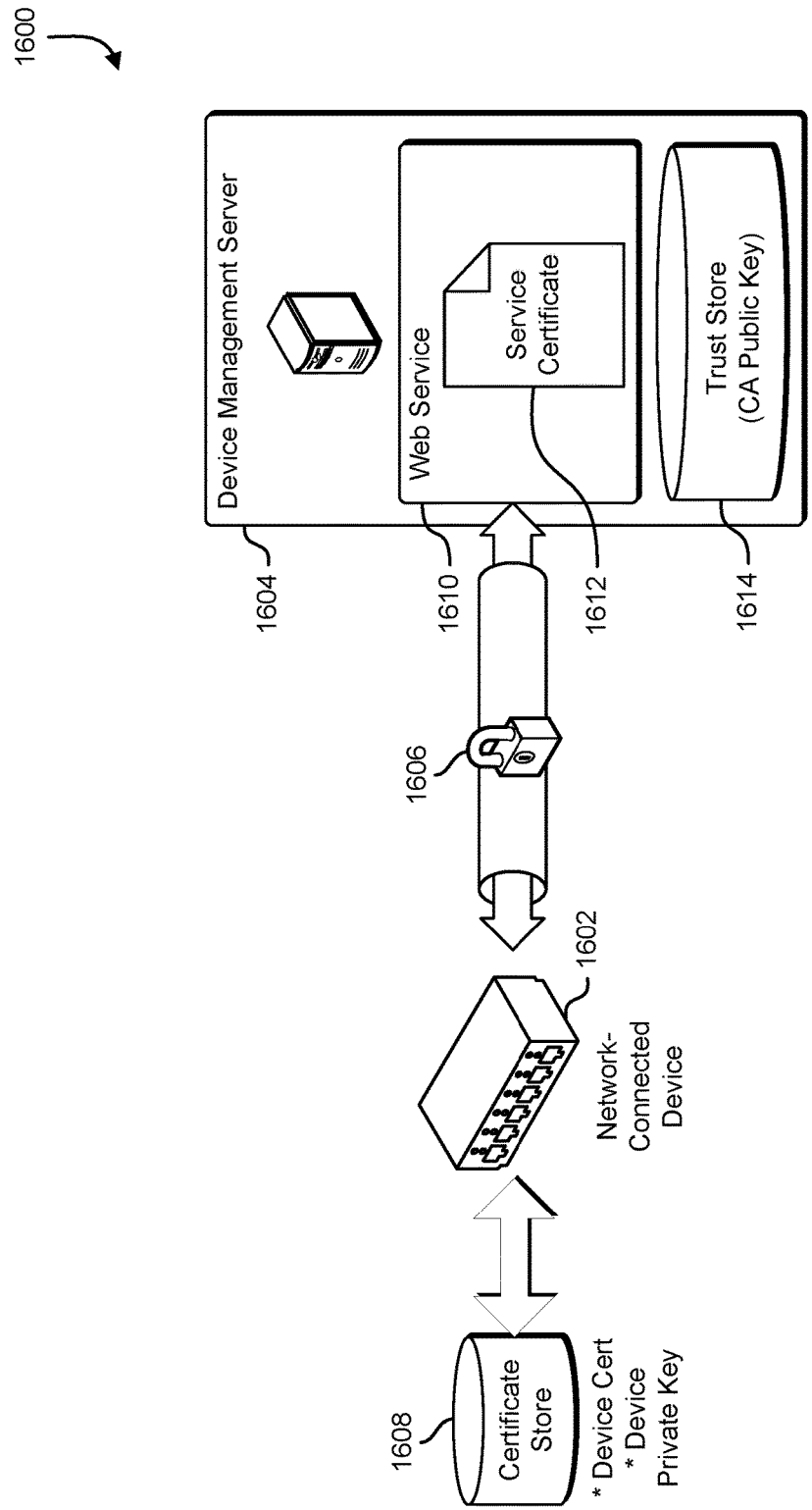
FIG. 16 shows an illustrative example of a system where implicit certificates are used to establish an authenticated communication session with a web service.

FIG. 16 shows an illustrative example of a system where implicit certificates are used to establish an authenticated communication session with a web service. A system diagram 1600 shows a network connected device 1602 that communicates with the device management server 1604 via a protected network connection 1606. The network connected device 1602 maintains a certificate store 1608. The certificate store 1608 holds an implicit certificate for use by the network connected device 1602 and a private key for the network connected device 1602. The network connected device 1602 can be a network connected sensor, network connected control device, network connected industrial controller, wearable device, a home appliance, or other network connected device.

The device management server 1604 hosts the web service 1610. The web service 1610 is a device-management service that communicates with the network connected device 1602. In some examples, the web service 1610 collects information from the network connected device 1602. In other examples, the web service 1610 sends commands to the network connected device 1602. In yet another example, the network connected device 1602 cents requests to the web service 1610 over the protected network connection 1606. In one implementation, the network connected device 1602 is a home appliance, and the home appliance sends a command to the web service 1610 requesting replacement of a consumable item. For example, the home appliance may be a printer and the consumable item may be an ink cartridge. In another example, the home appliance may be a dishwasher and a consumable item may be a detergent. In yet another example, the home appliance may be a furnace and the consumable item may be a filter.

The web service 1610 retains a service certificate 1612. In some examples, the service certificate 1612 is an implicit certificate issued to the web service 1610. In another example, the service certificate 1612 is an implicit certificate created in coordination with the network connected device 1602, and allows the web service 1610 to establish authenticated connection between the network connected device 1602 and the web service 1610. The device management server 1604 maintains a trust store 1614. The trust store 1614 holds public keys that are associated with entities which are trusted by the device management server 1604. The trust store 1614 retains a public key associated with a certificate authority that issued the service certificate 1612 and the device certificate associated with the network connected device 1602. In some implementations, the service certificate 1612 and the device certificate are matching implicit certificates that authenticate a communication between the network connected device 1602 and the web service 1610, and each certificate is authenticated with the public key of the certificate authority.

In various examples, the implicit certificates allow the network connected device 1602 and the web service 1610 to establish and authenticate a protected communication session using a shared secret. Successful generation and use of the shared secret implicitly authenticates the identity of the network connected device 1602 and the web service 1610.

Figure 17:
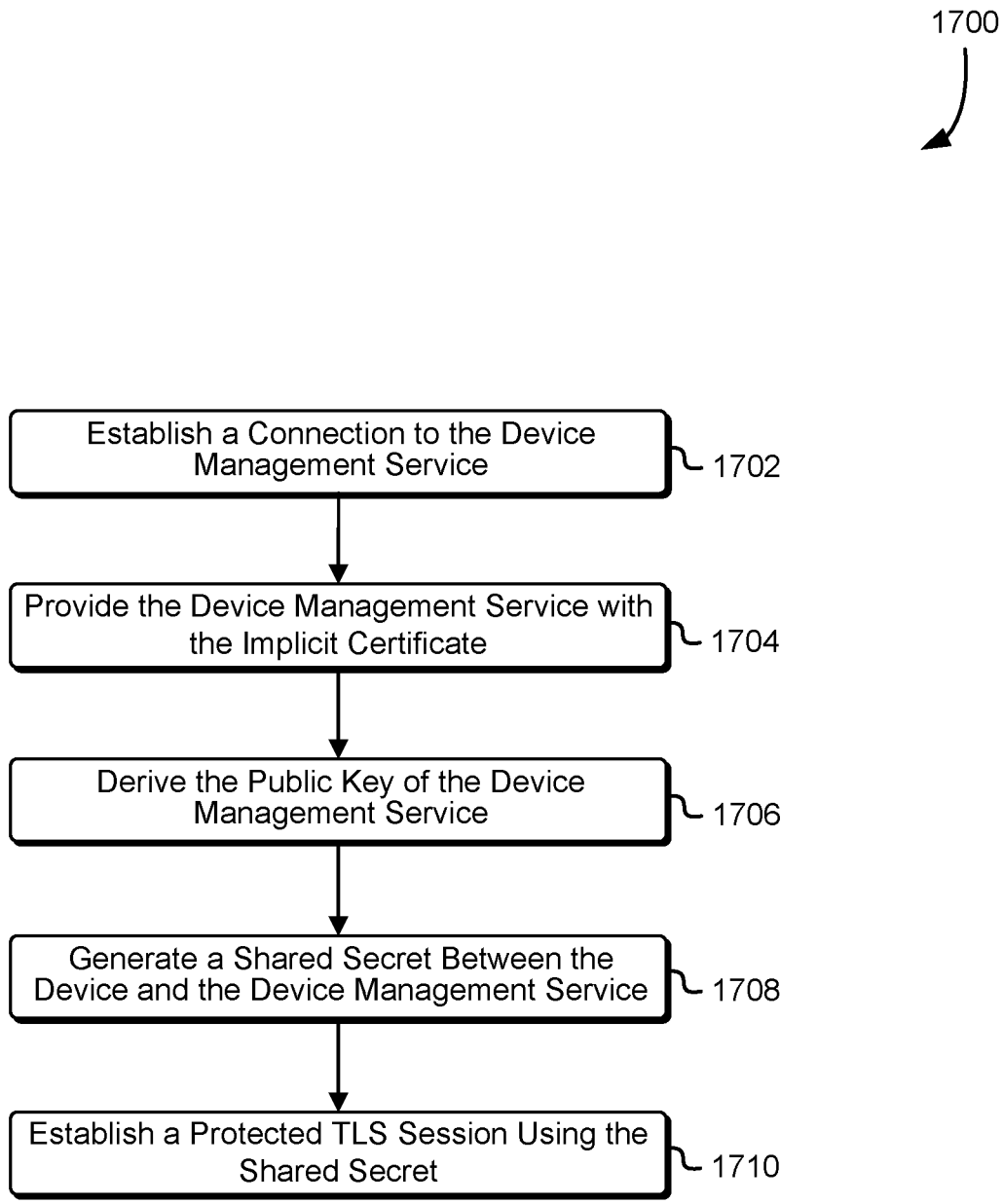
FIG. 17 shows an illustrative example of a process that, as a result of being performed by a device, establishes a protected communication session with a device management service using an implicit certificate.

FIG. 17 shows an illustrative example of a process that, as a result of being performed by a device, establishes a protected communication session with a device management service using an implicit certificate. A flowchart 1700 illustrates a process that begins at block 1702 with a device establishing a connection to a device management service. The connection may be established via a wired or wireless connection. In some examples, the connection is a network connection established in accordance with the transmission control protocol ("TCP"). In some implementations, the device initiates the establishment of the connection, and in other implementations, the device management service initiates the establishment of the connection between the device and the device management service.

The device and the device management service use an implicit certificate to establish the connection. At block 1704, the device provides the device management service with the implicit certificate. In some examples, the device provides the device management service with the implicit certificate by providing an identifier to the device management service, and the device management service uses the identifier to retrieve the implicit certificate. In some implementations, the certificate is provided by the device management service to the device. In some examples, the certificate is a certificate associated with the device that may be used to establish a communication session with any other entity. An example of a process for generating such an implicit certificate is illustrated in FIG. 3. In another example, the certificate is a certificate bound to both the device management service and the device (for example, as illustrated in FIG. 2), and the certificate may be used to establish a communication session only between the device and the device management service.

Using the certificate, the device derives 1706 the public key of the device management service. In some examples, the device management service is able to derive a public key for the device using the certificate. At block 1708, both the device and the device management service generate a shared secret. The device and the device management service exchange intermediate values, and the intermediate values and the certificate are used to generate a shared secret that is not easily acquired by a third party. At block 1710, the device and the device management service use the shared secret to establish a protected communication session. In some examples, the protected medication session is a transport layer security ("TLS") session, and the shared secret is used as a master secret used for generating session keys.

Figure 18:
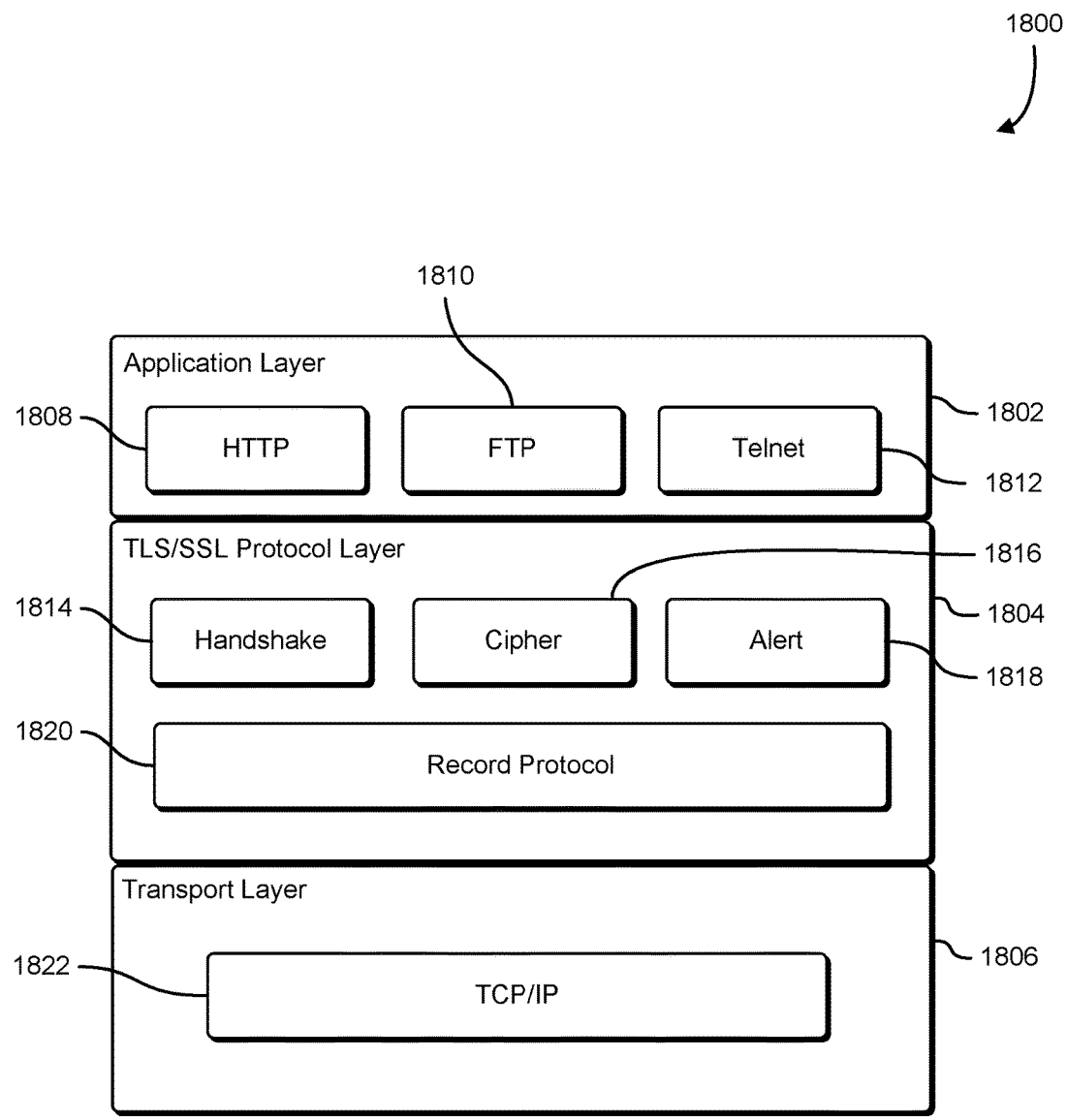
FIG. 18 shows an illustrative example of a network stack that implements the transport layer security ("TLS") protocol, in accordance with an embodiment.

FIG. 18 shows an illustrative example of a network stack that implements the TLS protocol, in accordance with an embodiment. The network stack diagram 1800 shows an application layer 1802, a secure sockets layer/transport layer security ("SSL/TLS") protocol layer 1804, and a transport layer 1806. The application layer 1802 includes a number of application protocols including an HTTP protocol 1808, an FTP protocol 1810, and a Telnet protocol 1812. The HTTP protocol 1808 utilizes the SSL/TLS protocol to create an HTTPS protocol. The FTP protocol 1810 uses the SSL/TLS protocol to create an FTPS protocol. The Telnet protocol 1812 utilizes the SSL/TLS protocol to implement a Telnet-TLS protocol.

The SSL/TLS protocol layer 1804 includes a handshake protocol 1814, a cipher protocol 1816, an alert protocol 1818, and a record protocol 1820. The handshake protocol 1814 is used to negotiate a secure connection. The handshake protocol 1814 can be used to establish a number of parameters associated with the secure connection such as a session identifier, a peer certificate, a compression method, a cipher spec, and a master secret. The cipher protocol 1816 is used to communicate changes in the ciphering strategy associated with the secure connection. The alert protocol 1818 is used to convey messages related to the status of the secure connection. Alert messages that convey a severity of "fatal" cause the termination of the secure connection.

The record protocol 1820 receives data from higher layers and fragments the data into chunks, optionally compresses the data, applies a Message Authentication Code ("MAC"), and encrypts and transmits the resulting data. When data is received over the network, the received data is decrypted, verified using the MAC, decompressed (if necessary), defragmented, and returned to higher layers. Application data messages can be carried by the record protocol 1820 and treated as transparent data to the record protocol 1820.

The SSL/TLS protocol layer 1804 operates on top of a transport layer 1806 that implements a TCP/IP protocol 1822. The TCP/IP protocol 1822 provides reliable connection-oriented and datagram protocols. UDP provides a connectionless transmission service that transmits an individual packet of information between two endpoints. The transmission is unreliable, in that receipt of the transmitted packet is not confirmed automatically by the recipient. TCP provides a connection-oriented transmission service that transmits a stream of data reliably between two endpoints. The transmission is reliable, and receipt of the stream of data is confirmed by the recipient.

Additional information regarding the User Datagram Protocol ("UDP") is described in RFC 768. Additional information regarding TCP is described in RFC 793. Additional information describing the TLS protocol (Version 1.2) is contained in RFC 5246 which is incorporated herein by reference.

Figure 19:
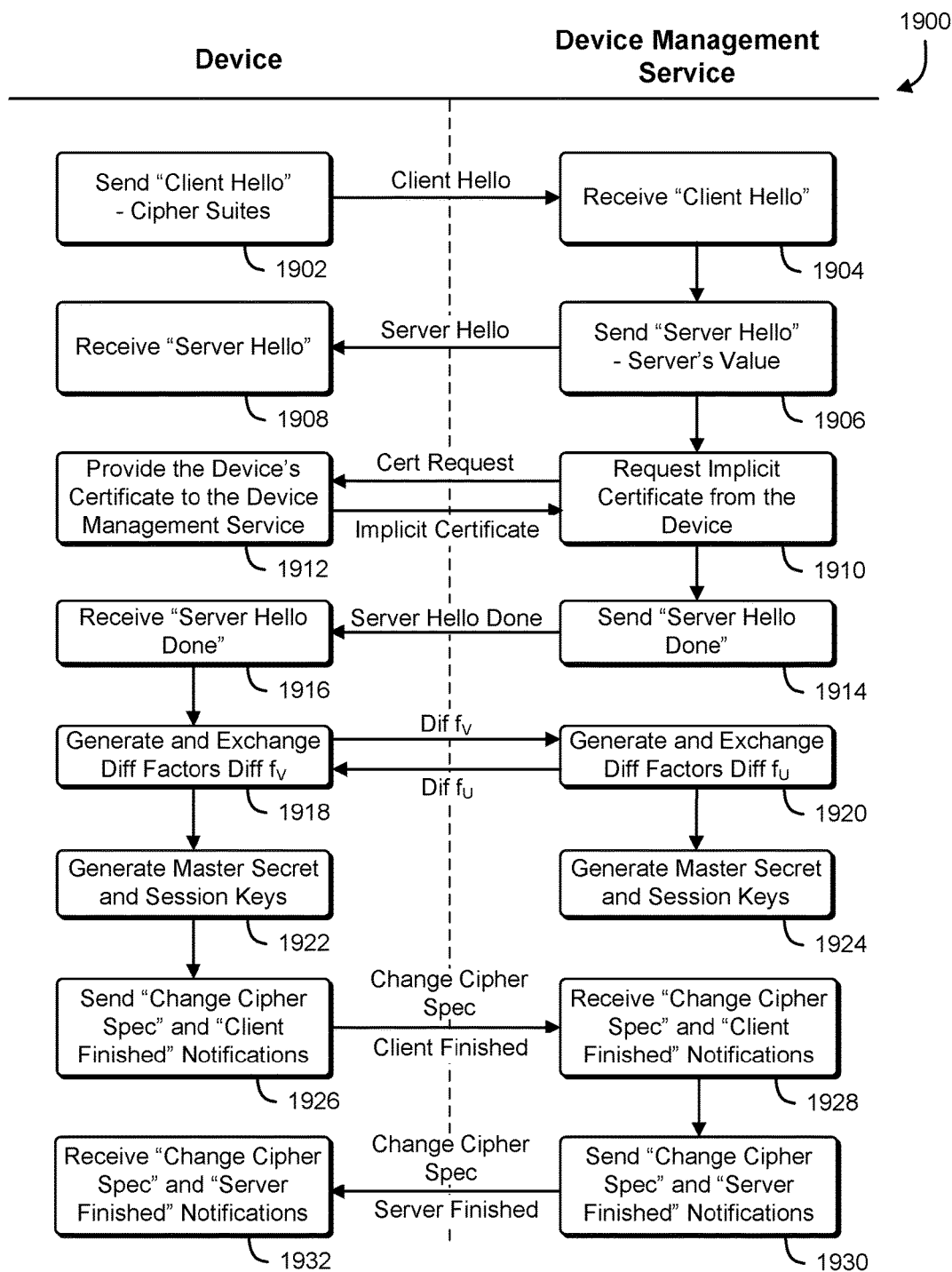
FIG. 19 shows an illustrative example of a process that, when performed by a client and a server, establishes a secure connection using the TLS protocol, in accordance with an embodiment.

FIG. 19 shows an illustrative example of a process that, when performed by a device and a device management service, establishes a protected connection using the TLS protocol, in accordance with an embodiment. A swim diagram 1900 illustrates a TLS handshake process that begins at block 1902. At block 1902, the device sends a "Client hello" message to the device management service. The "Client hello" message includes a list of cipher suites. The device management service receives 1904 the "Client hello" message from the device, and determines an acceptable set of mutually supported cipher suites based at least in part on the list of cipher suites provided by the device. The selected cipher suite may identify a key generation algorithm based on an implicit certificate, such as the process shown in FIG. 10 and FIG. 11. At block 1906, the device management service sends a "Server hello" message to the device including the determined set of cipher suites, allowing the device and the device management service to identify a key-exchange algorithm for use in establishing a protected connection. The device receives 1908 the "Server hello" message from the device management service along with the determined set of cipher suites. In some examples, the device management service sends a digital certificate to the device, so that the device can validate the identity of the device management service using the device management service's provided certificate.

In some implementations, the device provides an implicit digital certificate to the device management service. In some examples, the certificate is bound to both the device and the device management service, and facilitates authenticated communications between the device and the device management service where both the identity of the device and the device management service are authenticated. In another example, the certificate is bound to the device and facilitates authenticated communications between the device and any other entity where the identity of the device is authenticated. At block 1910, the device management service sends a request to the device for the device's digital certificate. At block 1912, the device responds to the request by providing an implicit digital certificate associated with the device to the device management service. If the device does not provide the requested digital certificate, the device management service may respond with a handshake failure alert, and the establishment of the connection may be aborted.

At block 1914, the device management service sends a "Server hello done" message to the device. The device receives 1916 the "Server hello done" message, and proceeds to block 1918 where the device determines a difference factor which is provided to the device management service. In response, at block 1920, the device management service determines a corresponding difference factor which is provided to the device. Both the device and the device management service use the difference factor from the other party and the implicit digital certificate to generate a pre-master secret which is known to both parties but difficult to determine for a third-party. Using the pre-master secret, the device generates a master secret and session keys at block 1922. At block 1924, the device management service generates a master secret and session keys. In some implementations, the pre-master secret is used as the master secret. The device signals 1926 that device will be switching to a secure cipher by sending a "change cipher spec" message to the device management service, followed by a "client finished" message. The device management service receives the "change cipher spec" message and the "client finished" message at block 1928. At block 1930, the device management service responds with its own "change cipher spec" message followed by a "server finished" message. The device receives the "change cipher spec" and the "server finished" message at block 1932.

Once the process illustrated in the swim diagram 1900 is completed, the secure session has been negotiated between the device and device management service. The device and the device management service can continue to transmit application data, secured by the negotiated cipher suite, using a record protocol.

Figure 20:
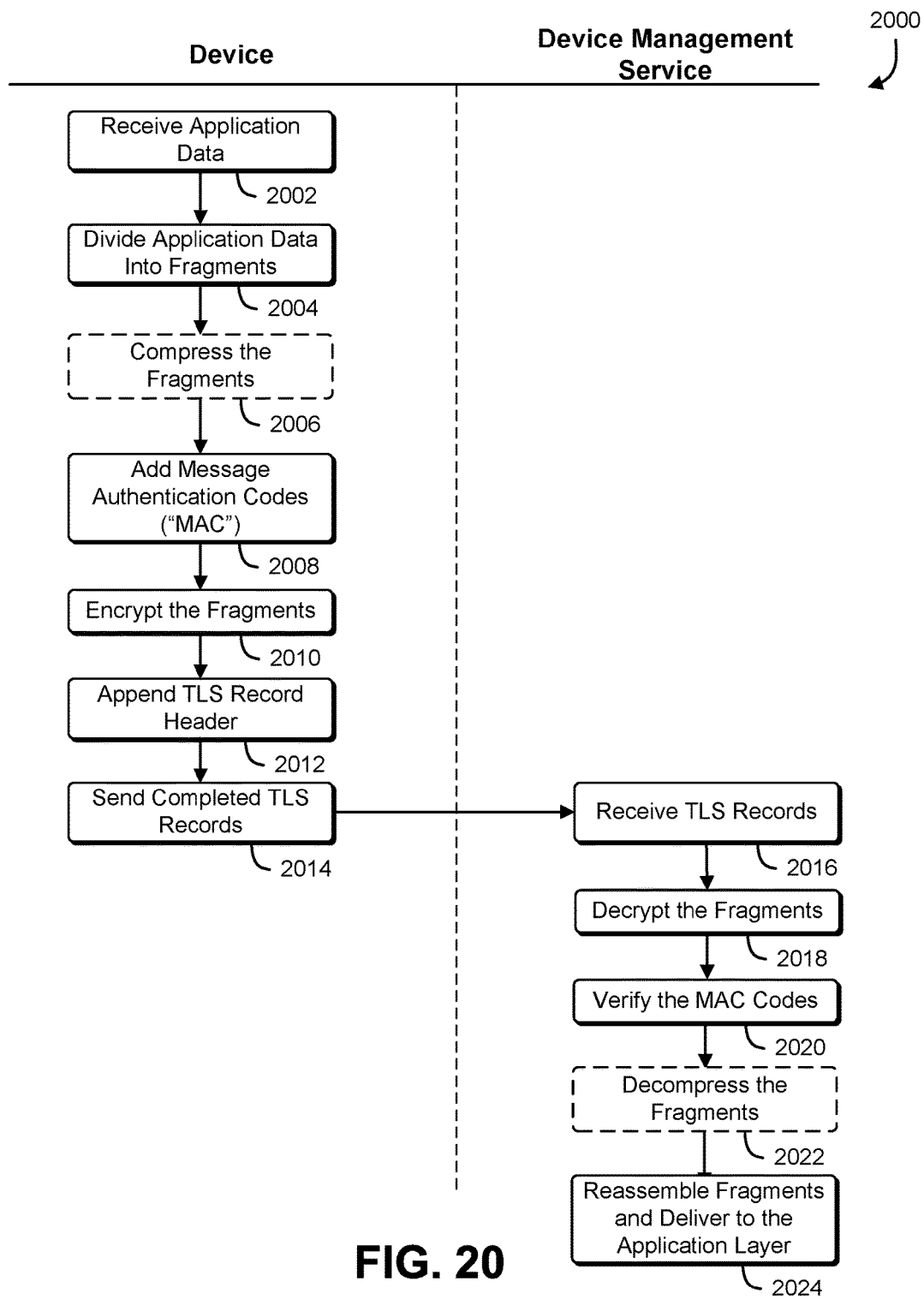
FIG. 20 shows an illustrative example of a process that, when performed by a sender and a receiver, transmits application data using the TLS protocol, in accordance with an embodiment.

FIG. 20 shows an illustrative example of a process that, when performed by a device and a device management service, transmits application data using the TLS protocol, in accordance with an embodiment. A swim diagram 2000 illustrates the use of a TLS record protocol to transmit data from the sender to the receiver. At block 2002, the sender receives data from an application. The data can be received in plaintext form and may be of an arbitrary length. At block 2004, sender divides the received application data into fragments of $2^{14}$ bytes or less. Optionally, the sender may compress the fragments at block 2006. Additional information regarding compression algorithms for TLS can be found in RFC 3749. If compression is used, the plaintext fragments are converted into compressed data fragments. At block 2008, the sender adds a message authentication code ("MAC") with a sequence number to each fragment that helps to protect the integrity of the data transmission. The sender encrypts 2010 the result, according to the negotiated cipher spec. At block 2012, the sender appends the TLS record header to the encrypted fragment. At block 2014, the completed fragments are sent and received 2016 by the receiver. In various examples, the operations may be performed in a different order. For example, in some implementations, the sender encrypts the data, and then adds a message authentication code to the encrypted data.

As fragments are received by the receiver, the receiver decrypts 2018 the fragments using the negotiated cipher spec and session keys. The integrity of the transmission is verified 2020 using the message authentication codes. If the received fragments are compressed, the receiver decompresses 2022 the compressed fragments to produce plaintext fragments. The fragments are reassembled 2024 to re-create the original transmitted data, and delivered to an application in the application layer.

Figure 21:
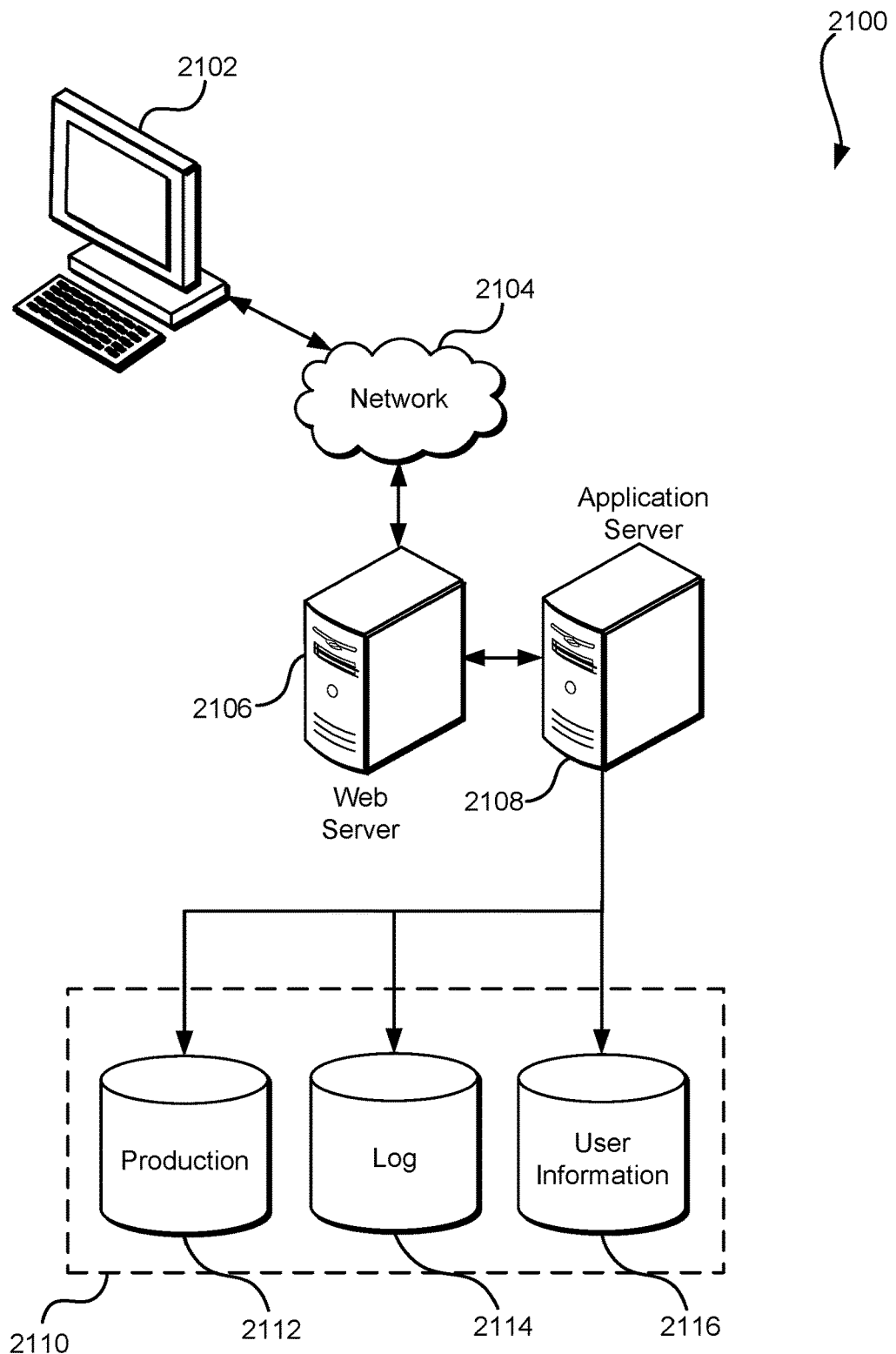
FIG. 21 illustrates an environment in which various embodiments can be implemented.

FIG. 21 illustrates aspects of an example environment 2100 for implementing aspects in accordance with various embodiments. As will be appreciated, although a web-based environment is used for purposes of explanation, different environments may be used, as appropriate, to implement various embodiments. The environment includes an electronic client device 2102, which can include any appropriate device operable to send and/or receive requests, messages, or information over an appropriate network 2104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 2106 for receiving requests and serving content in response thereto, although for other networks an alternative device serving a similar purpose could be used as would be apparent to one of ordinary skill in the art.

The illustrative environment includes at least one application server 2108 and a data store 2110. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 2102 and the application server 2108, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 2110 can include several separate data tables, databases, data documents, dynamic data storage schemes, and/or other data storage mechanisms and media for storing data relating to a particular aspect of the present disclosure. For example, the data store illustrated may include mechanisms for storing production data 2112 and user information 2116, which can be used to serve content for the production side. The data store also is shown to include a mechanism for storing log data 2114, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 2110. The data store 2110 is operable, through logic associated therewith, to receive instructions from the application server 2108 and obtain, update, or otherwise process data in response thereto. The application server 2108 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 2102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 21. Thus, the depiction of the system 2100 in FIG. 21 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

Note that a system is said to be configured to trust a public cryptographic key if logic with which the system is configured to operate is dependent on whether an attempt to verify a digital signature with the public cryptographic key is successful. Similarly, a system is said to be configured to trust a symmetric cryptographic key if logic with which the system is configured to operate is dependent on whether an attempt to verify a digital signature with the symmetric cryptographic key is successful.

In various embodiments, data objects such as digital certificates may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security. The key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). For example, an application may be provisioned with the private key and the data object may include a certificate for the private key for use by a system for verification of the digital signature of the data object. Other variations, including variations where a symmetric key shared between the user computer and the system that cryptographically verifies the data object can be used to encrypt and/or digitally sign the data object.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining, at a first entity, an implicit certificate associated with a communication channel between the first entity and a second entity;
    deriving, from the implicit certificate, a first private key associated with the first entity and a second public key associated with the second entity;
    obtaining a first private static key based at least in part on a distribution;
    determining a first difference based at least in part on the first private static key, a domain polynomial associated with a ring of integers, the first private key, and a first public key associated with the first entity;
    providing the first difference to the second entity;
    obtaining, from the second entity, a second difference that is based at least in part on a second private static key associated with the second entity, the domain polynomial associated with the ring of integers, a second private key associated with the second entity, and a second public key associated with the second entity;
    determining a second static public key from the second public key and the second difference; and
    generating a shared key based at least in part on the second public static key and the first private static key.

2. The computer-implemented method of claim 1, further comprising:
    determining a first private ephemeral key on the ring of integers;
    determining a first public ephemeral key based at least in part on the domain polynomial and first private ephemeral key;
    providing the first public ephemeral key to the second entity;
    obtaining a second public ephemeral key from the second entity; and
    wherein the shared key is based at least in part on the second public ephemeral key and the first private ephemeral key.

3. The computer-implemented method of claim 2, further comprising:
    selecting a sample from a ring of integers;
    determining the shared key based at least in part on the difference between a product of the second public static key and the first private ephemeral key, and a product of the second public ephemeral key and the first private static key; and
    extracting shared bits from coefficients of the sample.

4. The computer-implemented method of claim 1, further comprising:
    establishing a network connection from the first entity to the second entity;
    generating a message;
    encrypting the message with the shared key to produce an encrypted message;
    transmitting the encrypted message to the second entity via the network connection; and wherein the first entity and the second entity are computer systems.

5. The computer-implemented method of claim 1, wherein the ring of integers is part of a ring learning with errors problem used to generate the implicit certificate.

6. A system, comprising:
one or more processors; and
memory that stores computer-executable instructions that, if executed, cause the one or more processors to:
 derive, from an implicit certificate, a first private key associated with a first entity and a second public key associated with a second entity;
 obtain a first private static key;
 provide a first difference to the second entity, the first difference based at least in part on the first private static key, a domain polynomial associated with a ring of integers, the first private key, and a first public key associated with the first entity;
 obtain, from the second entity, a second difference that is based at least in part on a second private static key associated with the second entity, the domain polynomial associated with the ring of integers, a second private key associated with the second entity, and a second public key associated with the second entity;
 determine a second static public key from the second public key and the second difference; and
 generate a shared key based at least in part on the first private static key and the second static public key.

7. The system of claim 6, wherein the first private static key is generated stochastically based at least in part on a probability distribution.

8. The system of claim 6, wherein the instructions further comprise instructions that, if executed, cause the one or more processors to use the shared key to communicate using encrypted communications.

9. The system of claim 6, wherein the first difference enables the second entity to derive the shared key.

10. The system of claim 6, wherein the implicit certificate is associated with a communication channel between the first entity and a second entity.

11. The system of claim 6, wherein:
determining the shared key based at least in part on the first private static key and the second static public key; and
the shared key is determined based at least in part on an ephemeral key generated by the second entity.

12. The system of claim 6, wherein the instructions further comprise instructions that, if executed, cause the one or more processors to:
 determine a first private ephemeral key;
 determine a first public ephemeral key based at least in part on the first private ephemeral key; and
 provide the first public ephemeral key to the second entity to enable the second entity to determine the shared key.

13. The system of claim 6, wherein the instructions further comprise instructions that, if executed, cause the one or more processors to:
 obtain a message;
 generate a digital signature for the message using the shared key; and
 provide the message and the digital signature to the second entity.

14. A non-transitory computer-readable storage medium including executable instructions that, as a result of being executed by one or more processors of a computer system, cause the computer system to at least:
 derive, from an implicit certificate, a second public key associated with a second entity;
 obtain a first private static key;
 determining a first difference based at least in part on the first private static key, a domain polynomial associated with a ring of integers, the first private key, and a first public key associated with the first entity;
 providing the first difference to the second entity;
 obtaining, from the second entity, a second difference that is based at least in part on a second private static key associated with the second entity, the domain polynomial associated with the ring of integers, a second private key associated with the second entity, and a second public key associated with the second entity;
 determine a second static public key from the second public key and the value;
 generate a shared key based at least in part on the second static public key, and the first private static key.

15. The non-transitory computer-readable storage medium of claim 14, wherein the instructions further comprise instructions that, as a result of being executed by the one or more processors, cause the computer system to:
 determine a first public ephemeral key associated with the first entity;
 provide the first public ephemeral key to the second entity; and
 obtain a second public ephemeral key from the second entity.

16. The non-transitory computer-readable storage medium of claim 15, wherein the second public ephemeral key is used by the first entity to generate the shared key.

17. The non-transitory computer-readable storage medium of claim 15, wherein the instructions further comprise instructions that, as a result of being executed by the one or more processors, cause the computer system to:
 determine the first public ephemeral key based at least in part on the first private ephemeral key.

18. The non-transitory computer-readable storage medium of claim 14, wherein the instructions further comprise instructions that, as a result of being executed by the one or more processors, cause the computer system to:
 use the shared key to encrypt a message to result in an encrypted message; and
 transmit the encrypted message to the second entity.

19. The non-transitory computer-readable storage medium of claim 14, wherein the value is generated based at least in part on a second private static key associated with the second entity, a domain polynomial associated with a ring of integers, the second private key, and the second public key.

20. The non-transitory computer-readable storage medium of claim 14, wherein successful use of the second public key verifies a cryptographic binding between the second entity and the second public key.

21. The non-transitory computer-readable storage medium of claim 14, wherein the instructions further comprise instructions that, as a result of being executed by the one or more processors, cause the computer system to verify that the implicit certificate is bound to the second entity by verifying a digital signature using the shared key.

* * * * *